US009552391B1

(12) United States Patent
Taylor et al.

(10) Patent No.: US 9,552,391 B1
(45) Date of Patent: Jan. 24, 2017

(54) APPARATUS AND METHOD FOR IMPROVISED EXPLOSIVE DEVICE (IED) NETWORK ANALYSIS

(71) Applicant: The United States of America, as represented by the Secretary of the Navy, Washington, DC (US)

(72) Inventors: John G. Taylor, Coronado, CA (US); Deak C. Childress, Lynchburg, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 917 days.

(21) Appl. No.: 13/901,308

(22) Filed: May 23, 2013

Related U.S. Application Data

(60) Provisional application No. 61/652,489, filed on May 29, 2012.

(51) Int. Cl.
  *G06F 17/30* (2006.01)
  *G06F 3/0484* (2013.01)
  *G06T 11/60* (2006.01)

(52) U.S. Cl.
  CPC ..... *G06F 17/30477* (2013.01); *G06F 3/04842* (2013.01); *G06F 3/04847* (2013.01); *G06F 17/30061* (2013.01); *G06F 17/30241* (2013.01); *G06T 11/60* (2013.01)

(58) Field of Classification Search
  CPC ................ G06F 17/30477; G06F 17/30241; G06F 3/04842; G06F 17/30061; G06F 3/04847; G06T 11/60

USPC ......................................................... 707/758
See application file for complete search history.

(56) References Cited

U.S. PATENT DOCUMENTS

| 4,091,366 A * | 5/1978 | Lavallee | G08B 25/10 340/524 |
| 7,233,546 B2 * | 6/2007 | Berkovich | G01S 11/12 367/128 |
| 7,602,329 B2 * | 10/2009 | Manderville | F41A 17/06 342/126 |
| 7,719,428 B2 * | 5/2010 | Fisher | F41H 13/00 340/573.1 |

(Continued)

OTHER PUBLICATIONS

Longley, Carrick, "Redefining Intelligence Support in a Resource Constrained Environment", Joint Special Operations University Report 11-4 (Jul. 2011), pp. 1-54.

(Continued)

*Primary Examiner* — Evan Aspinwall
(74) *Attorney, Agent, or Firm* — Naval Postgraduate School; Lisa A. Norris

(57) ABSTRACT

Tools and apparatus are presented for identification and analysis of improvised explosive device (IED) networks, including data acquisition tools and techniques providing structured prompting and predefined answers for acquiring structured IED data reports in a streamlined fashion using uniform terminology with respect to IED components and/or structure, as well as analysis methodologies employing IED component level analysis with adjustable similarity correlation and IED attribute filtering to expeditiously identify likely IED networks using graphical renderings of IED locations in a given geolocation range of interest and connection indicators.

20 Claims, 25 Drawing Sheets

(56) References Cited

U.S. PATENT DOCUMENTS

| | | | | |
|---|---|---|---|---|
| 7,750,814 | B2 * | 7/2010 | Fisher | F41H 11/00 340/573.1 |
| 2007/0060045 | A1 * | 3/2007 | Prautzsch | H04B 7/18523 455/3.06 |
| 2008/0008044 | A1 * | 1/2008 | Patterson | G01S 5/22 367/128 |
| 2009/0002494 | A1 * | 1/2009 | Calhoun | G01S 7/003 348/159 |
| 2009/0086577 | A1 * | 4/2009 | Ledeczi | G01S 5/22 367/129 |
| 2009/0240660 | A1 * | 9/2009 | Morgan | G06F 17/30997 |
| 2009/0240699 | A1 * | 9/2009 | Morgan | G06F 17/30997 |
| 2010/0013628 | A1 * | 1/2010 | Monroe | H04N 7/181 340/539.18 |
| 2010/0119053 | A1 * | 5/2010 | Goeldi | G06Q 10/00 379/265.09 |
| 2013/0159330 | A1 * | 6/2013 | Smith | G06Q 10/1091 707/758 |

OTHER PUBLICATIONS

Analytic Technologies, "Data Collection for Ego Networks", (n.d.), http://www.analytictech.com/networks/egonet.htm, obtained from the World Wide Web May 3, 2013, 4 pages.

Longley, Carrick, "Fighting Human Trafficking With Data" (288-page book), Palantir Technologies, http//www.palantir.com/, 2012, obtained from the World Wide Web May 3, 2013, 2 pages.

"IBM i2 Analyst's Notebook", http://www.i2group.com/us/products/analysis-product-line/analysts-notebook, IBM Software White Paper, Oct. 2012, pp. 1-15.

U.S. Government Accountability Office (GAO), Warfighter Support: Actions Needed to Improve Visibility and Coordination of DOD's Counter-Improvised Explosive Device Efforts, GAO-10-95, Oct. 29, 2009, obtained from the World Wide Web May 3, 2013, 4 pages.

"ORA", Computational Analysis of Social and Organizational Systems, http://www.casos.cs.cmu.edu/projects/ora/, obtained from World Wide Web May 3, 2013, 2 pages.

Milian, Mark, "U.S. Government, Military to Get Secure Android Phones", CNN Tech, http://www.cnn.com/2012/02/03/tech/mobile/government-android-phones/index.html, Feb. 3, 2012, obtained from the World Wide Web May 3, 2013, 5 pages.

Ackerman, Spencer, "Army Shows Off Soldier Smartphone", Wired: Danger Room, http://www.wired.com/dangerroom/2011/10/army-smartphone-beta/, Oct. 6, 2011, obtained from the World Wide Web May 3, 2013, 4 pages.

Montalbano, Elizabeth, "Army Launches Mobile Apps Store Prototype", Information Week: Government, http://www.informationweek.com/news/government/mobile/232602904, Mar. 20, 2012, obtained from the World Wide Web May 3, 2013, 5 pages.

* cited by examiner

120

| IR | SITE |
|---|---|
| INCIDENT BEING REPORTED: | IED |
| GRID | MGRS OF INCIDENT EX: 38SMC0123456789 | 18TWK8271899352 |
| IED | ROUTE NAME | PENNSYLVANIA |
| RESOURCES THREATENED | TARGETED | C.F. PERSONNEL |
| IED | LOCATION | ROADSIDE HIDDEN | ASR (ALTERNATE SUPPLY ROUTE) |
| VICTIM C.R.E.W. SYSTEM | PYTHON |
| VICTIM C.R.E.W. STATUS | ON DURING ATTACK/DISCOVERY |
| EOD C.R.E.W. SYSTEM | PYTHON |
| IMPACT ON UNIT MANEUVER(S) | MISSION(S) | ASR CLOSURE |
| IED | TYPE BY FUNCTION | VOIED |
| VOIED | TYPE BY FUNCTION | CRUSH SWITCH |
| VOIED | CRUSH SWITCH METHOD OF EMPLOYMENT | SURFACE LAID (ACROSS ROAD) |
| VOIED | CRUSH SWITCH MATERIAL | XMAS LIGHTS |
| VOIED | CRUSH SWITCH LENGTH | 30 FT |
| EOD APPROACH | ROBOTIC |
| EOD ROBOTICS EMPLOYED | TALON |
| IED | EXPLOSIVE COMPONENTS | PROJECTILE |
| IED | PROJECTILE TYPE BY FUNCTION | (HE) HIGH EXPLOSIVE |
| IED | PROJECTILE SIZE(S) | 152mm |
| IED | PROJECTILE FUZE(S) | NONE | NOSE-WELL PRIMED W/EXPLOSIVE |
| IED | PROJECTILE NOMENCLATURE | 3OF45 |
| IED | PROJECTILE COUNTRY OF ORIGIN | RUSSIAN |
| IED | PROJECTILE QUANTITY | 3 |
| IED | PROJECTILES DAISY CHAINED? | Yes |
| IED | SWITCH TYPE BY FUNCTION | PRESSURE |
| IED | INITIATOR - DETONATOR | COMMERCIAL BLASTING CAP, DETONATING CORD |
| IED | BLASTING CAP TYPE BY FUNCTION | ELECTRIC |
| IED | BLASTING CAP LEAD WIRE INTEL | RED | BLUE |
| IED | DET-CORD COLOR | GREEN |
| IED | POWER SOURCE | 9-VOLT BATTERY |
| IED | POWER SOURCE BRAND (i.e. Duracel, Camelion, etc.) | ENERGIZER |
| EOD R.S.P. | BIP |

FIG. 19

| IED Incident # | TBF | Explosive Type | Power Source | Switch |
|---|---|---|---|---|
| 20 | 1 | 6 | 3 | 1 |
| 21 | 1 | 8 | 2 | 3 |
| 22 | 3 | 13 | 5 | 2 |
| 23 | 5 | 17 | 4 | 1 |
| 24 | 4 | 9 | 5 | 1 |
| 25 | 2 | 2 | 5 | 4 |
| 26 | 1 | 5 | 2 | 5 |
| 27 | 1 | 13 | 1 | 2 |
| 28 | 2 | 13 | 1 | 2 |
| 29 | 4 | 5 | 3 | 3 |
| 30 | 3 | 4 | 4 | 5 |
| 31 | 3 | 1 | 6 | 4 |
| 32 | 2 | 1 | 1 | 1 |
| 33 | 1 | 6 | 3 | 2 |
| 34 | 4 | 9 | 4 | 1 |
| 35 | 5 | 11 | 1 | 4 |

FIG. 20

| Incident # | ied_tbf | ied_explosive | ied_switch_tbf | ied_initiator | powersource | ied_tbf | voied_crush_switch_material | ied_projectile_tbf | ied_mortar_tbf |
|---|---|---|---|---|---|---|---|---|---|
| 350 | voied | projectile | pressure_switch | | | voied_pressure_switch | | he_high_explosive_projectile | |
| 348 | voied | projectile | pressure_switch | | | voied_crush_switch | XMAS LIGHTS | he_high_explosive_projectile | |
| 347 | voied | mortar | pressure_switch | military_blasting_cap | 9volt_battery | voied_crush_switch | XMAS LIGHTS | | he_high_explosive_mortar |
| 346 | voied | projectile | pressure_switch | detonating_cord | 9volt_battery | voied_crush_switch | XMAS LIGHTS | he_high_explosive_projectile | |
| 344 | voied | bomb | pressure_switch | | | voied_crush_switch | MCPS | | |
| 343 | voied | projectile | pressure_switch | | | voied_crush_switch | XMAS LIGHTS | he_high_explosive_projectile | |
| 342 | voied | projectile | pressure_switch | | | voied_pressure_switch | | he_high_explosive_projectile | |
| 339 | voied | mortar | pressure_switch | | | voied_pressure_switch | | | he_high_explosive_mortar |
| 338 | voied | projectile | pressure_switch | | | voied_crush_switch | MCPS | he_high_explosive_projectile | |
| 336 | voied | projectile | pressure_switch | | | voied_crush_switch | XMAS LIGHTS | he_high_explosive_projectile | |
| 302 | voied | pe4a | | | | voied_magnetic | | | |
| 295 | voied | hme | | | | voied_pressure_switch | | | |
| 291 | voied | hme | pressure_switch | | 9volt_battery | voied_crush_switch | MCPS | | |
| 290 | voied | hme | pressure_switch | | | voied_crush_switch | MCPS | | |
| 289 | voied | hme | | | 12volt_motorcycle_battery | voied_crush_switch | XMAS LIGHTS | | |
| 288 | voied | hme | pressure_switch | | | voied_crush_switch | MCPS | | |
| 286 | voied | hme | pressure_switch | | | voied_crush_switch | XMAS LIGHTS | | |
| 285 | voied | hme | | | | voied_crush_switch | XMAS LIGHTS | | |
| 283 | voied | hme | | | | voied_pressure_switch | | | |
| 280 | voied | hme | | | 9volt_battery | voied_pressure_switch | | | |
| 278 | voied | hme | | | | voied_crush_switch | MCPS | | |
| 275 | voied | hme | slide_switch | | | voied_crush_switch | XMAS LIGHTS | | |
| 274 | voied | hme | toggle_switch | | 9volt_battery | voied_crush_switch | XMAS LIGHTS | | |
| 175 | voied | semtex | | | 9volt_battery | voied_p.i.r. | | | |
| 174 | voied | semtex | | | 12volt_car_battery | voied_p.i.r. | | | |
| 169 | voied | projectile,hme | | | | | | he_high_explosive_projectile | |

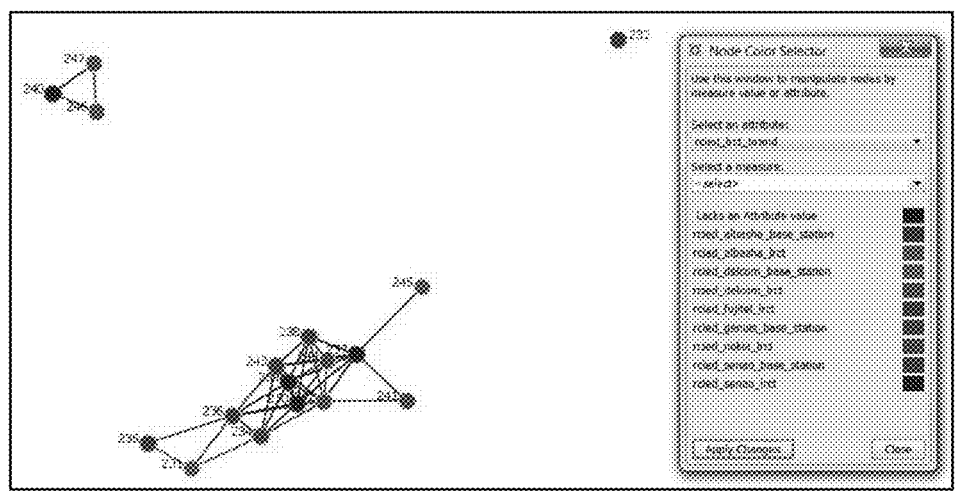
FIG. 38    SC = 42.5%
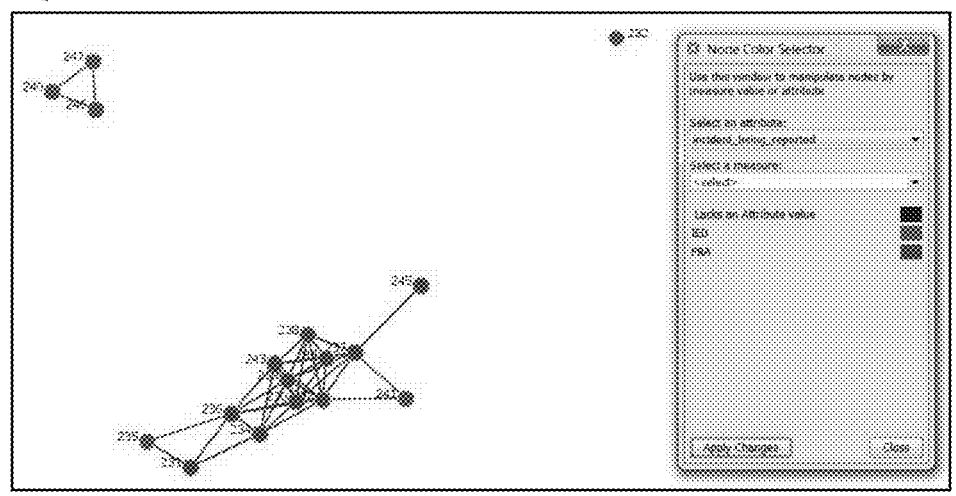
FIG. 39    SC = 42.5%

APPARATUS AND METHOD FOR IMPROVISED EXPLOSIVE DEVICE (IED) NETWORK ANALYSIS

REFERENCE TO RELATED APPLICATION

This application claims priority to and the benefit of U.S. Provisional Patent Application Ser. No. 61/652,489, filed May 29, 2012, and entitled "Method for Improvised Explosive Device Network Analysis", the entirety of which is hereby incorporated by reference.

BACKGROUND

Members of the armed forces and civilians are daily put at risk in various theaters to improvised explosive devices (IEDs). Accordingly, military and civilian authorities are tasked with combating those who create and proliferate IEDs, particularly networks of persons cooperating to build, deploy, and activate IEDs. Despite best efforts to identify and eradicate IED networks through the use of human and signals intelligence, IEDs continue to be a threat to safety of armed forces personnel as well as civilians. Accordingly, improved methodologies and apparatus are desirable for use by counter-IED (C-IED) personnel and organizations to identify IED networks.

SUMMARY OF DISCLOSURE

Various details of the present disclosure are hereinafter summarized to facilitate a basic understanding, where this summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter.

The present disclosure provides techniques and apparatus for gathering and organizing IED report data, particularly with respect to component and/or structural characteristics or attributes thereof using standardized questions and predetermined answers for generating structured IED report data. In addition, the disclosure provides analytical techniques by which suspected or likely IED networks can be expeditiously identified. The disclosure presents an advance over previous human and signal based data gathering and analysis concepts, and certain implementations advantageously employ essentially commercial off-the-shelf (COTS) hardware with customized data acquisition applications that facilitate expeditious data-gathering by counter-IED (C-IED) personnel and organizations to generate IED reports corresponding to individual IED sites, with the capability to download generated reports to a structured database for further analysis. The provision of the structured database, in turn, facilitates component level analysis and other techniques which can advantageously utilize social network analysis (SNA) and sociogram type visual renderings of IED locations and relationships based on component analysis in order to expedite the identification of potential IED networks. This early identification provides the ability to direct resources to appropriate high-confidence targets for anti-IED network remediation or further investigation.

In accordance with one or more aspects of the present disclosure, apparatus is provided for acquiring and assembling IED data. The apparatus includes one or more processors as well as an electronic memory storing prompting information with predefined questions and corresponding predefined answers with respect to IED components and/or IED structure. A user interface renders some or all of the prompting information to a user and receives user selected answers to at least some of the questions presented. The apparatus generates an IED report for a given IED including a geolocation associated with that IED and user selected answers associated with that IED, and the report is stored in the electronic memory for subsequent downloading to an external system, such as a structured database in certain implementations. In certain embodiments, the prompting information includes at least one predefined question and multiple corresponding predefined answers with respect to IED type, IED activation components, IED explosive components and/or IED projectile components. The use of IED component and/or structure specific questioning along with predefined answers advantageously facilitates assembly of data for corresponding IED reports that can be compared expeditiously with respect to the component and/or structure attributes of the assembled data across multiple reports. This enhances the ability to quickly identify commonalities and levels of commonality among large sets of IED data reports in order to identify patterns for subsequent analysis.

In certain embodiments, the apparatus may include a camera and the prompting information can be used to prompt the user to take a photo of an IED site and store the corresponding image data as part of the IED report for a given IED site. In certain implementations, moreover, the user interface allows the user to draw a sketch, such as using a stylus pen or other drawing implement to make a sketch on a tablet, smart phone, or other computer-implemented portable device, and the corresponding image data is stored as part of the IED report. Certain embodiments also allow a user to enter text and/or audio data (e.g., speech) for quick association of additional information with the IED report data, thus allowing a user a free-form platform for supplementing the predefined answer data on-site without reliance upon memory for annotation after the user has left the site.

Methods are provided for acquiring and assembling improvised explosive device data in accordance with further aspects of the disclosure. The methods include prompting a user with predefined questions and corresponding predefined answers with respect to IED components and/or structure, as well as receiving user selected answers to at least some of the questions. The method further includes generating one or more IED reports individually associated with a given IED, where the individual reports include a geolocation as well as user selected answers associated with the given IED. One or more IED reports are then stored in an electronic memory. In certain implementations, the method also includes providing one or more IED reports to a structured database. The prompting in certain embodiments includes prompting the user with at least one predefined question and a corresponding plurality of predefined answers with respect to IED type, IED activation components, IED explosive components and/or IED projectile components.

Data analysis methods are provided in accordance with further aspects of the present disclosure for analyzing IED data. The method includes selecting a geolocation range for analysis, accessing a structured database with multiple IED records associated with the selected geolocation range, selecting a plurality of attributes associated with IED components and/or structure, and selecting an initial similarity correlation percentage value. The method further involves comparing IED records for each IED against records for each other IED in the selected geolocation range based on the selected attributes. For each pair of IEDs, a percentage of matching of the selected attributes is computed, and each pair whose matching percentage is greater than or equal to the selected similarity correlation percentage value is identified as being related. Each analyzed IED is then visually rendered at a corresponding geolocation within the selected geolocation range, including lines connecting all IED pairs identified as being related. A user can then selectively adjust the similarity correlation percentage value and/or the selected attributes, and the process is repeated using the adjusted parameters. This analytical approach allows a user to visually zero in on IED relationships that pertain to likelihood of common origin, and thus to an identifiable IED network of one or more persons creating and/or deploying the devices. The user is allowed in certain embodiments to selectively set different colors for visually rendering IEDs with respect to subsets of analyzed attributes, thus allowing easy visual differentiation between multiple potential networks. In addition, certain embodiments allow overlaying the visual rendering of analyzed IEDs on a map or satellite image corresponding to the rendered geolocation range.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which:

FIG. 19 is a table showing an exemplary IED report data structure;

FIG. 20 is an exemplary numerical data set in spreadsheet form;

FIG. 21 is an exemplary set of data records obtained from a structured data set;

FIG. 22 is a portion of an initial agent by resource IED attribute data set;

FIG. 23 is a portion of a newly-generated IED by IED network data set;

FIGS. 32-39 are exemplary screenshots in the analysis tool showing sociograms with user adjustment of similarity correlation settings and attribute filters in accordance with the present disclosure.

DETAILED DESCRIPTION OF THE DISCLOSURE

Figure 1:
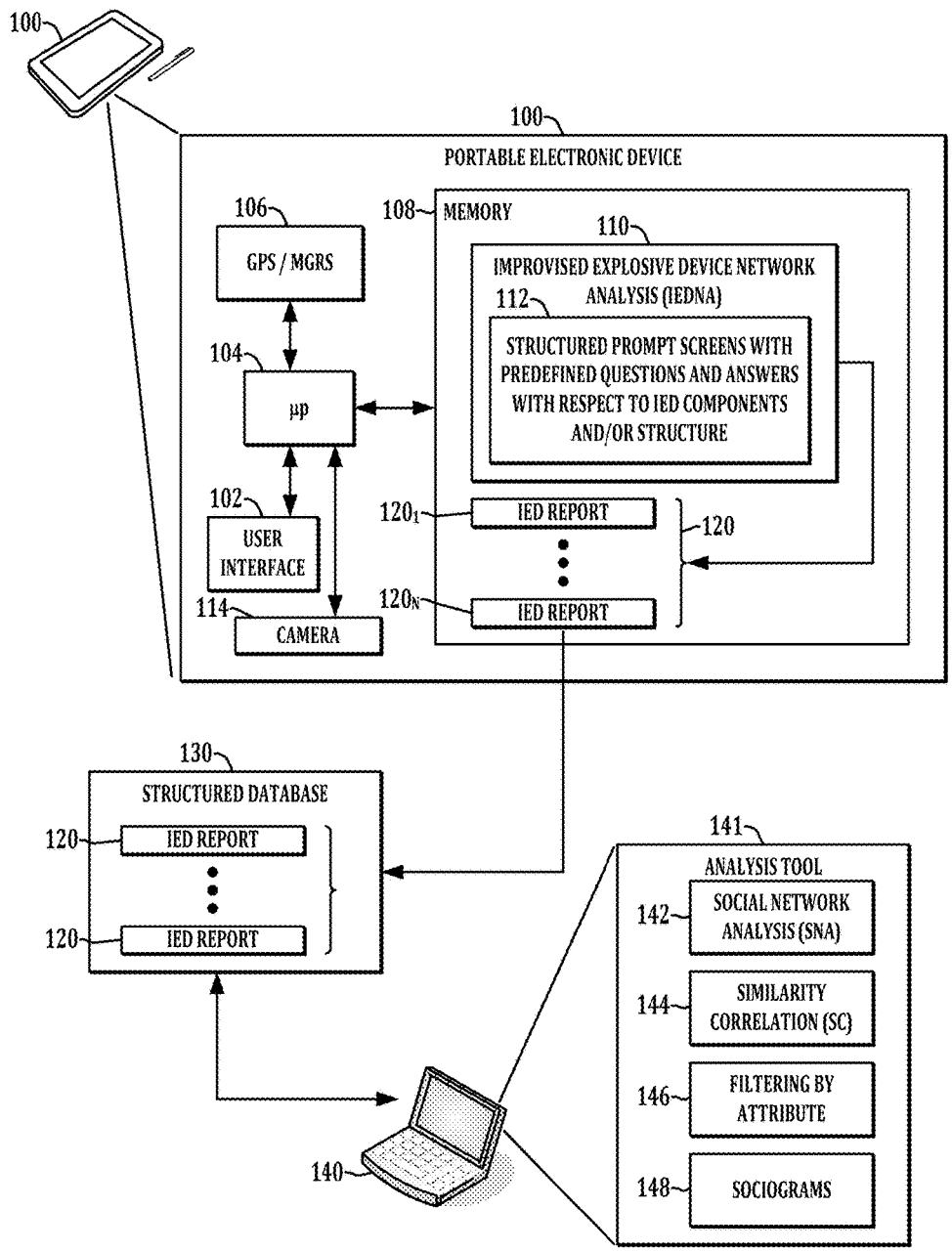
FIG. 1 is a system diagram illustrating portable electronic device data acquisition tools for entry of IED structure and component attributes on-site, and creation of IED reports for provision to a structured database, as well as processor-based analysis tools for expeditious identification of IED networks in accordance with one or more aspects of the present disclosure.

One or more embodiments or implementations are set forth in conjunction with the drawings, where like reference numerals refer to like elements throughout, and where the various features are not necessarily drawn to scale.

FIG. 1 illustrates a portable electronic device 100 programmed with application software to operate as a data acquisition tool for acquiring and assembling improvised explosive device (IED) data, as well as a structured database 130 including a number of IED reports 120 generated by the portable electronic device 100 and other like devices, as well as a computer-based system including an analysis tool 141. IEDs may be built and deployed by individuals, but are commonly built and deployed by groups of persons, referred to herein as IED networks or cells. When an IED is exploded, or is otherwise detected, on-scene personnel gather information related to the IED, wherein the data acquisition device 100 advantageously facilitates the data input process using structured prompting information 112 to provide IED reports 120 suitable for advanced social network analysis type processing in the analysis tool 141.

In the past, on-scene data collection has been largely unstructured, whereas the apparatus of the present disclosure enables accurate and standardized on-scene data collection to facilitate expedited Processing, Exploitation and Dissemination (PED) intelligence operations. In practice, on-scene data collection can be limited and difficult, depending on battlefield conditions. On-site personnel perform a variety of tasks, including for post-blast analysis (PBA) or sensitive site exploitation (SSE), and are thus time constrained in their ability to acquire a large amount of IED analysis data while on-site. Thusfar, IED data acquisition has, to a certain extent, involved personnel creating reports after the fact, based on memory and brief notes taken on-site. In any event, on-scene IED data collection is likely to remain extremely limited and difficult. The inventors have appreciated that reducing turnaround time on actionable intelligence can assist Counter-IED (C-IED) in proactively attacking IED networks as opposed to reacting to enemy action. Identifying and fielding technologies and training to locate IEDs before they explode, and to prevent those devices from exploding, involves identifying emerging enemy tactics, techniques and procedures (TTPs) and timely providing the knowledge and equipment necessary to counter those TTPs. The present disclosure provides tools and techniques to identify and facilitate attacking networks of IED builders, financiers, and emplacers (IED networks).

As seen in FIG. 1, the device 100 includes a user interface 102, one or more microprocessors 104, and an electronic memory 108 operatively coupled with the processor 104. The memory 108 stores an IED network analysis (IEDNA) component 110, which may be a processor-executed application or program executed by the processor 104, with the corresponding program instructions stored in the memory 108. The electronic device 100 may be any suitable form a processor-implemented portable device, including without limitation a smart phone, a tablet, laptop or notebook computer, PDA, etc. The IEDNA component 110, moreover, includes structured prompting information 112 including predefined questions and corresponding predefined answers with respect to IED components and/or IED structure. A question need not be in the form of a sentence, but can be any prompting, whether textual, audible, icon-based, etc., by which the user is prompted in a predefined manner to reply by selecting one or more answers from a predefined list. The answers, likewise, need not be words, but can be icons, abbreviations, buttons, icons, or other user-selectable indicia responsive to the prompting to select a response to the prompted question.

In operation, the user interface 102 operates under control of the processor 104 according to the program instructions of the IEDNA component 110 to render one or more prompting screens of the prompting information 112 to a user and to receive user selected answers to at least some of the predefined questions. Using the user selected answers, the processor 104 generates one or more IED reports 120 and stores these in the local memory 108, where each IED report 120 is associated with a given IED and the individual reports 120 include a geolocation associated with the IED as well as a plurality of user selected answers associated with that IED. In certain embodiments, the portable electronic device 100 may include a global positioning system (GPS) component 106 which operates according to known techniques to determine the present position of the device 100 and to provide corresponding latitude and longitude data values to the processor 104 for inclusion in the corresponding IED report 120. In certain implementations, moreover, the device 100 may include other forms of geolocation assessment components 106 which provide an indication of the present device location for inclusion in the report 120 and/or the user interface 102 may prompt the user to enter the current location according to any suitable protocol or grid system, such as GPS (latitude, longitude), Military Grid Reference System (MGRS), Universal Transverse Mercator (UTM) grid system, the Universal Polar Stereographic (UPS) grid system, etc. The processor 104 generates one or more IED reports 120, each associated with a specific IED, and including the corresponding IED geolocation and the user selected answers to the predefined questions. The reports 120 are stored in the electronic memory 108, and may be subsequently downloaded to an external system, such as the illustrated structured database 130, to a server, a network, etc. The device 100, in this regard, may include suitable communications ports, hardware, and operating software to enable transfer of the IED reports 120 using known technology.

In addition, certain implementations of the apparatus 100 may include a camera 114 and/or communications terminals (e.g., USB, etc.) to allow the user to take a photograph for incorporation into an IED report 120 and/or to upload image data obtained from an external digital camera or other source for inclusion in the report 120. In certain implementations, the processor 104 employs the user interface 102 to prompt the user to take a photo of an IED site, and to store the corresponding image data as part of the IED report 120 in the memory 108. Also, as seen in FIG. 1, the user interface 102 may include the capability for a user to draw on the display screen, for example, using a stylus pen, mouse, touchscreen, their finger, etc. In certain implementations, the processor 104 is configured to use the user interface 102 to prompt the user to draw a sketch, for example, a sketch of an IED scene or site, and to store the corresponding image data as part of the IED report 120. Moreover, the user interface 102 may include the capability for a user to enter text, such as using a hardware keyboard, a soft keyboard implemented using a touchscreen display, etc., and the processor 104 employs to interface 102 to prompt the user to enter text associated with a given IED, and stores the entered text as part of the IED report 120. In various embodiments, moreover, the interface 102 allows a user to enter and record audio information, such as speech, and the processor 104 employs the interface 102 to prompt the user to enter audio information corresponding to a given IED, and to store the entered audio information as part of the corresponding IED report 120.

The prompting information 112 provides predefined questions, including at least some questions and corresponding predefined answers that pertain to IED components and/or IED structure. In certain embodiments, for example, the prompting information 112 includes at least one predefined question and a corresponding plurality of predefined answers with respect to IED type. In addition, the prompting information 112 may have one or more predefined questions, each having multiple corresponding predefined answers regarding IED activation components. Moreover, the prompting information 112 may include one or more predefined questionings and corresponding predefined answers regarding IED explosive components and/or IED projectile components. In this manner, the reports 120 are populated with component and/or structure information in uniform terminology, thereby facilitating subsequent analysis using the analysis tool 140 accessing multiple IED reports 120 from the structured database 130.

As seen in FIG. 1, moreover, the analysis tool 141 may be implemented in any suitable computing device, such as a laptop computer 140 as shown, or other processor-implemented device. The analysis tool 141 operates in certain implementations in conjunction with access to a structured database 130 having multiple IED report records 120; although such a database 130 and/or a relevant portion thereof may be stored locally in the computer 140 running the analysis tool 141. In the illustrated embodiment, the analysis tool 141 includes a social network analysis (SNA) component 142 operative to perform one or more analysis tasks or functions with respect to the IED data from multiple reports 120, as well as a similarity correlation (SC) component 144 described further below. In addition, the analysis tool 141 provides a component 146 for filtering analyzed data by attribute, as well as a visual rendering or sociogram component 148. Operation of the analysis tool 141 is further described below in connection with FIGS. 24-40.

Figure 2:
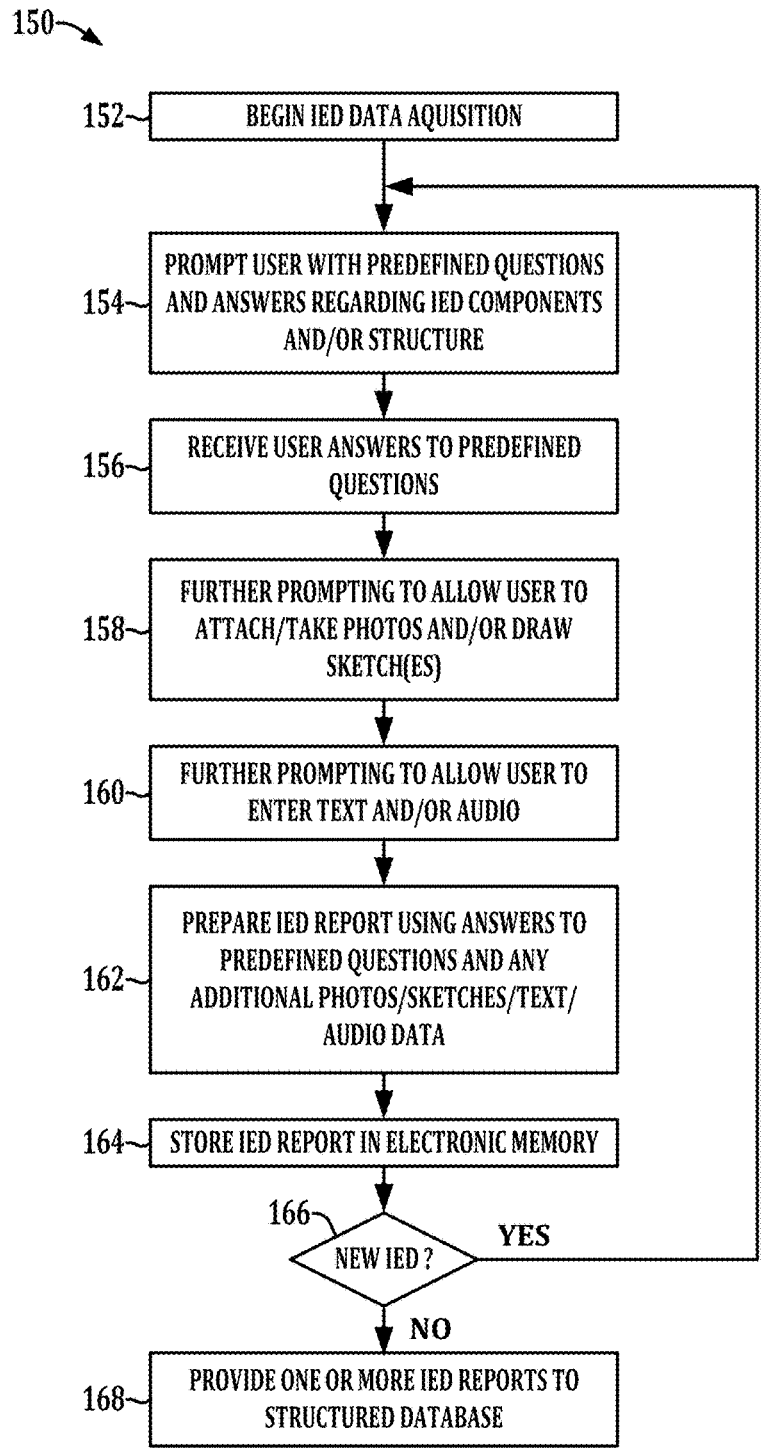
FIG. 2 is a flow diagram illustrating an exemplary process for acquiring structured IED report data in accordance with the present disclosure.

FIG. 2 illustrates an exemplary method 150 that may be used for IED data acquisition via the apparatus 100 of FIG. 1. While the exemplary method 150 and other methods of the present disclosure are depicted and described in the form of a series of acts or events, it will be appreciated that the various methods of the disclosure are not limited by the illustrated ordering of such acts or events except as specifically set forth herein. Except as specifically provided hereinafter, some acts or events may occur in different order and/or concurrently with other acts or events apart from those illustrated and described herein, and not all illustrated steps may be required to implement a process or method in accordance with the present disclosure. The illustrated methods may be implemented in hardware, processor-executed software, or combinations thereof, in order to provide IED data acquisition and analysis functions as described herein, and various embodiments or implementations include non-transitory computer readable mediums having computer-executable instructions for performing the illustrated and described methods. For instance, the method 150 mainly implemented in association with the apparatus 100 of FIG. 1, and the method 500 of FIG. 24 below may be implemented using the computer 140 of FIG. 1, and these devices 100 and 140 may be programmed with corresponding computer-executable instructions for implementing the described methods.

IED data acquisition begins at 152 in FIG. 2, and a user is prompted at 154 with predefined questions and answers regarding IED components and/or structure. For example, as seen in FIGS. 3-18, the user may be presented with a series of screens on a display of the host device 100, where the prompt screens in the illustrated implementations provide pushbutton type user actuatable indicia (soft keys) or other means by which a user can choose a predefined answer corresponding to the presented question. In the illustrated implementations, for example, a plurality of potential answers are presented via textual descriptions, and the user can simply push the selected answer to enter the corresponding answer data into the associated IED report 120. At 156 in FIG. 2, the device 100 receives the user answers to the predefined questions, and further prompting may be provided at 158 to allow the user to attach (e.g., upload) or take photos (e.g., using the on-board camera 114 of FIG. 1 above). In addition, the user may be prompted at 158 to draw a sketch or make other drawings for inclusion in the report 120, for instance, using a stylus pen on a tablet, or even using a finger on a touch-screen device 100. At 160 in FIG. 2, the user may optionally be prompted to enter text and/or audio, with the device 100 storing the entered text and/or audio data for inclusion in the IED report 120.

At 162, the device 100 prepares an IED report 120 using the received answers to at least some of the predefined questions, and any additional photos, sketches, text and/or audio data received from the user. The IED report is stored at 164 into the electronic memory 108, and a determination is made at 166 as to whether another IED report is to be generated. If so (YES at 166), the process 150 returns to 154-164 as described above for the new IED. Once data has been collected for all IEDs (NO at 166), the process 150 proceeds to 168 where one or more IED reports 120 are provided to a structured database or other external system (e.g., to the structured database 130 shown in FIG. 1). The device 100 thus provides prompting and receipt of user selected answers to one or more predefined questions relating to IED structure and/or components, and generates corresponding IED reports 120 individually associated with a given IED, where the individual reports included geolocation associated with the IED as well as the user selected answers, and stores these for later downloading.

The inventors have appreciated that attacking IED networks is can be facilitated by structuring IED component/structure data and use of SNA tools. In this regard, networks of individuals constructing and deploying IEDs typically take precautions to hide their activities. Traditional SNA techniques can be used to try to understand social networks by focusing on the ways that individuals interact with one another and the influence they have on one another, where the SNA approach utilizes four basic components, including structural intuition based on ties linking actors, systematic empirical data, graphic imagery of the resulting networks (e.g. sociograms), and the use of mathematical and/or computational models. Thusfar, however, previous attempts to apply SNA to IED networks have shown that the information on these networks is incomplete at best, and the information that does exist can be misleading due to the concealment efforts of the members of the networks. Moreover, prior attempts to adapt SNA methodologies to addressing C-IED issues have met with only limited success, and it is believed that the shortcomings of these prior attempts has been due to unstructured data and the nature of the data itself.

The present disclosure provides improved data acquisition and analysis systems and techniques which can be advantageously employed in IED network analysis for a variety of purposes, including without limitation identification and/or detection of IED network evolution and adaptation, IED Emplacement Networks (consisting of personnel directly involved with IED usage) and IED Enabling Networks (consisting of communities that indirectly support the IED Emplacement Networks), detecting emerging IED threats and trends, distinguishing different classes of IED networks, and clarifying what the IED network(s) looks like. The ability to accurately define an IED network through SNA techniques is facilitated by the accuracy and structure of the data collected by the above-described techniques. In this regard, the inventors have appreciated that strictly focusing C-IED network analysis on the human factors of the network entails reliance on data that is largely either incomplete or misleading because it relies on intelligence sources that have relatively high levels of inaccuracy and deception inherent to them, such as Human Intelligence (HUMINT) and Signals Intelligence (SIGINT).

In addition to the limitations of using SNA techniques based on human or signal intelligence data, personnel responding to IED explosions or initial discoveries prior to explosion do not have time or resources to investigate and collect detailed human intelligence and/or signal intelligence data. Moreover, the inventors have appreciated that component and/or structure information related to the IED itself is largely indicative of IED networks associated with their creation and/or deployment. Stated differently, each IED has a "signature voice" (e.g. how it was constructed, materials used, placed, and detonated) that, if properly structured and subsequently analyzed, can aide in bringing to life an existing or emerging IED network or IED threat. The inventors have found that comparing the ways in which IEDs are constructed can identify an IED architect's "calling card" or "signature" and illuminate potential bomb-making cells. Moreover, the inventors have appreciated that the application of SNA analysis techniques need not be restricted to the human-dimension, and that focusing on the inanimate aspects of a network can yield valuable understanding of that network. Accordingly, the described data acquisition devices 100 and techniques 150 can be successfully combined with SNA-based analytical tools 141 and processes 500 to yield a powerful system for identifying IED networks that expeditiously uses on-site data in a structured manner.

The present disclosure contemplates a structured database 130 built using structured reports 120 acquired using the described apparatus 100, where the data of the data store 130 is structured in a way that allows for ease of access and analysis. By applying SNA techniques to the inanimate, physical characteristics of IED networks (e.g. circuit board construction, initiation type, explosive type, batteries, etc.), IED networks become illuminated since the IEDs themselves cannot remain hidden the way operational human networks do by the very nature of the fact that IEDs are utilized in a way that exposes them, whether or not they are exploded or recovered intact. Additionally, focusing the analysis on the physical characteristics of individual IEDs eliminates the possibility for deception and incomplete information inherent in HUMINT and SIGINT. The resulting temporal requirements of the PED cycle are reduced because the intelligence collected on-scene is more accurate. The data collected by C-IED personnel does not require the same layers of vetting and analysis that is required for SIGINT and HUMINT data, nor is component data subject to enemy efforts at deception. This report data 120 is also more complete since the physical evidence of an IED is almost never destroyed in its entirety, where even exploded IEDs typically yield large amounts of physical evidence.

The provision of the structured IED reports 120 and collection thereof in a structured database 130 facilitates use of the analysis tool 142 to visualize the data via SNA methodologies, representing a significant advance over prior SNA techniques based on human and/or signal data. The apparatus and methodologies of the present disclosure can be successfully implemented, moreover, largely using existing commercial off-the-shelf (COTS) technology and open-source software can be used to improve the data collection process, although custom application software and apparatus may alternatively be used. Once IED component data is properly structured via the reports 120 in that database 130, the intelligence generated from the physical components of IEDs can be analyzed to fill the gaps in knowledge of IED networks, allowing analysts to build a much more complete picture of the ways that IED networks operate.

C-IED is a remarkably complex strategy. Streamlining and structuring the IED data collection process can reduce some of the complexity inherently involved in conducting and coordinating C-IED network analysis, network targeting and attack operations. The present disclosure provides an innovative way to collect and structure IED data into reports 120, as well as techniques for conducting rapid IED analysis that illuminates potential bomb-making cells with this structured data 130, and provides rapid, tactical level IED intelligence, where it is needed most. The overarching objectives are direct: illuminate, isolate and eliminate potential IED networks. At the tactical C-IED level, where targeting and attack operations are conducted, a great deal of IED intelligence is collected during Post-Blast Analyses (PBA), Sensitive Site Exploitation (SSE), and IED neutralization operations that can aide in both illuminating the IED environment and in developing attack strategies. The concepts of the present disclosure facilitate the capability to rapidly visualize and illuminate an IED environment based on IED attributes such as IED type and activation mode or activation components (e.g. Victim Operated, Remote Controlled, Command Wire, etc.), and other IED component or structure data. Intelligent use of this data 120 allows C-IED forces to isolate and focus efforts on specific targets, develop strategies, and comprehensively visualize the IED networks they desire to attack. The inventors have thus appreciated that rapid illumination of the overall IED terrain and the ability to isolate IED sub-networks to enhance and accelerate strategies for targeting and attack operations can be accomplished by providing tools and methods for quickly collecting and structuring the enormous amounts of IED component data in order to visualize these IED networks.

As previously noted, all IEDs are not one and the same, and cannot be targeted or attacked as such. Trying to understand and attack an entire IED network is impractical. For example, a Remote-Controlled IED (RCIED) is not the same as a Command-Wire IED (CWIED), and neither of those are the same as a Victim Operated IEDs (VOIEDs). Together, these types of IEDs represent the entire network. Culled from the overall network, they can be represented and treated as IED sub-networks. Each sub-network has its own attributes that separate it from the others. For example, the use of DTMF signaling to trigger an IED is an attribute of an RCIED. C-IED operators must be able to illuminate IED networks of interest by attributes like type-by-function (TBF), explosive use and IED 'ingredients.' Focusing on IED components allows C-IED forces to better understand what and how much IEDs have in common, how the IEDs relate to the overall network, and how to pull specific value out of large datasets.

The provision of the IED network analysis component 110 and the structured prompting information 112 in a portable electronic device 100, as well as the subsequent use of the analysis tool 141 accessing reports 120 of a structured database 130 streamlines the IED data collection process, automatically generates IED incident reports, reduces reporting burdens on EOD technicians structures the report data 120 using universal terminology (C-IED Lexicon), improves IED report accuracy as well as IED network illumination for quickly identifying potential IED networks or cells, speeds up Processing, Exploitation and Dissemination (PED) cycles and produces empirical IED network data for justifying Concept of Operations (CONOP) development and collections emphasis requests (e.g. ISR), as well as providing immediate access to C-IED Field Guides.

Figure 16:
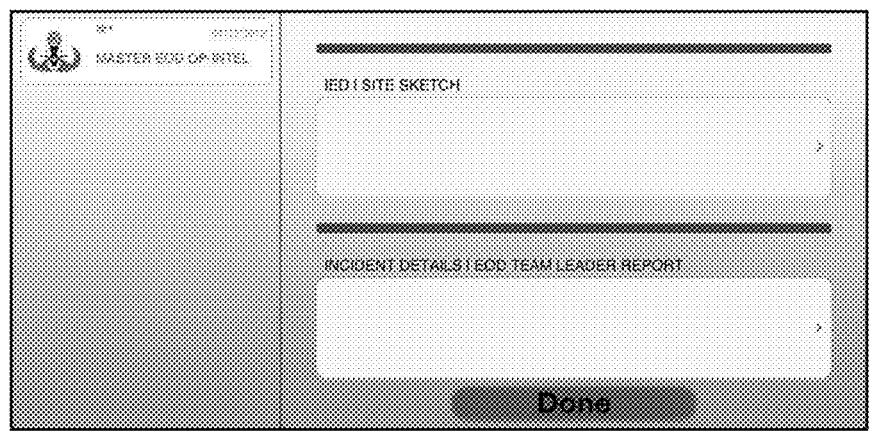
Figure 17:
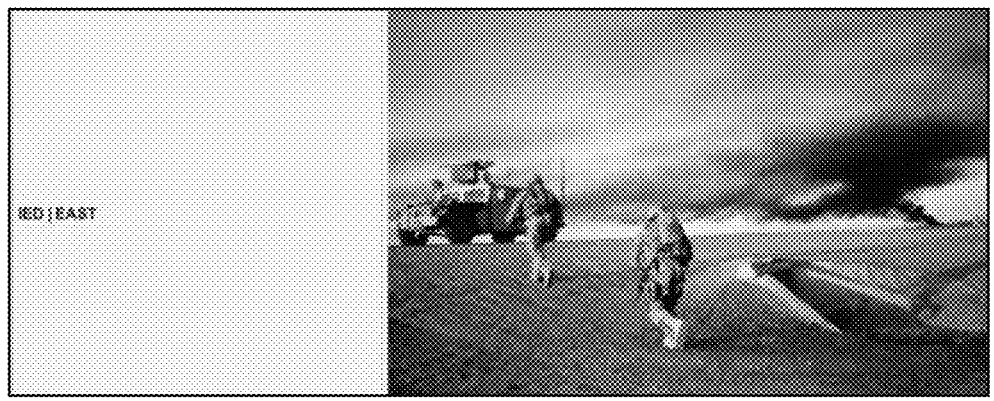
FIGS. 17 and 18 are screenshots showing entry of photographs into the data acquisition tool.
Figure 18:
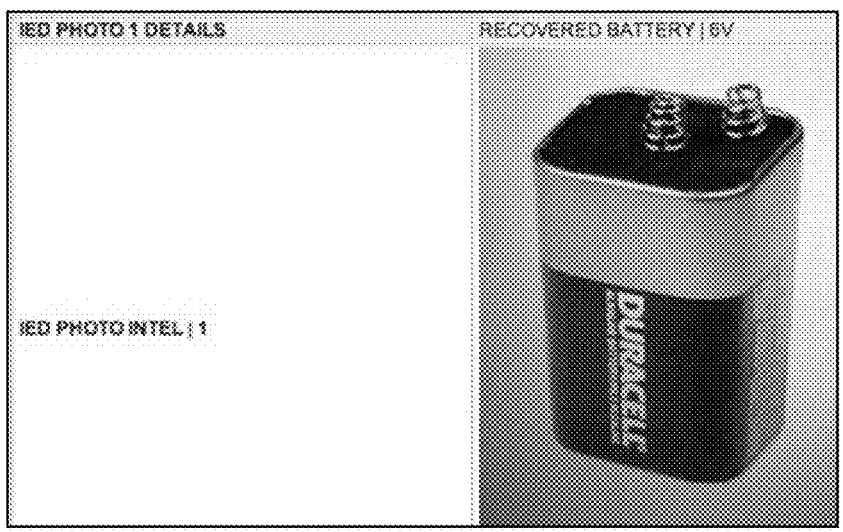

Referring also to FIGS. 3-23, FIGS. 3-16 illustrate example user interface screenshots in the device 100 showing predefined user prompting questions and corresponding predefined answers, and FIGS. 17 and 18 show entry of photographs into the data acquisition tool 100. The IED network analysis tool 100 can be implemented as described above to aide in capturing and structuring IED data into reports 120, as well as to provide C-IED personnel with a prompted guide to on-scene data collection. The device 100 thus provides a portable tool that reminds the user what to look for when conducting IED neutralization, SSE, or PBA operations. As seen in FIGS. 3-18, the IED network analysis (data acquisition) device 100 is logic driven, allowing a user to select a specific category, and the device 100 automatically calls-up data fields for which the user will likely want to collect data. This ensures that only the data that is pertinent to the situation is collected, and eliminates extraneous reporting. Moreover, the device 100 reduces the reporting burden on EOD Team Leaders by eliminating the need to manually generate reports after returning from an IED incident. The report 120 is thus generated during on-scene data collection, and therefore reduces reporting errors by virtually eliminating the need to recall information from the user's memory after the fact. Moreover, the illustrated implementation is predominantly push-button based, with the report 120 being generated in the application background as the user navigates his/her way through an IED incident. The application 110 reports only those fields populated with data in constructing the IED report 120, and thus the report 120 is void of blank fields or 'Not Applicable' data. Consequently, the report 120 represents exactly what the user reported, and nothing more, thereby avoiding uncertainty regarding whether an IED attribute associated with a particular field was indeed not present, or was simply not reported, as was the case in the past.

Figure 3:
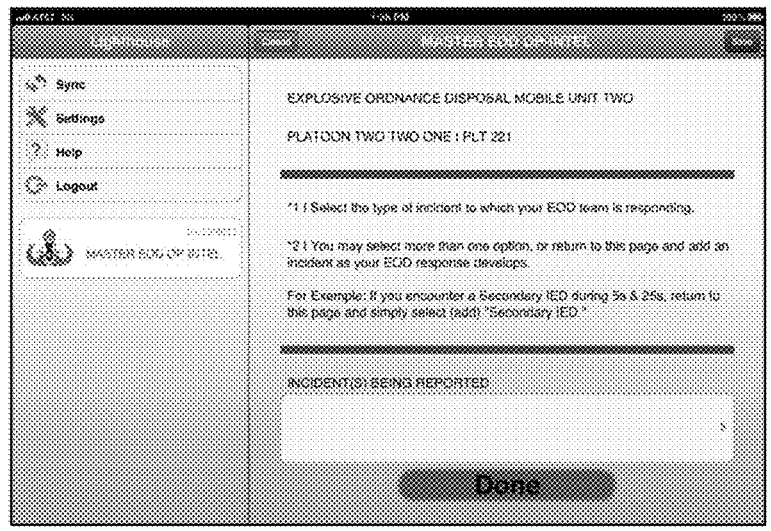
FIGS. 3-16 are exemplary user interface screenshots showing predefined user prompting in the data acquisition tool of FIG. 1.

The illustrated screenshots in FIGS. 3-16 are but one example, and the system 100 is dynamic and can be reprogrammed with changes to the predefined questions and/or answers, for example, to add new answers as different types or constructions of IEDs are found. The homepage can be adjusted to identify specific platoons. In the screenshot 200 of FIG. 3, the platoon identifier 'PL T 221' was used for demonstration purposes. Additionally, the on-screen instructions can be adjusted to meet user needs. As seen in FIG. 3, the home screen allows the user to select the type of incident to which the EOD team is responding, and the user may always return to the screen to add further incidents as the EOD response develops (e.g., secondary IEDs).

Figure 4:
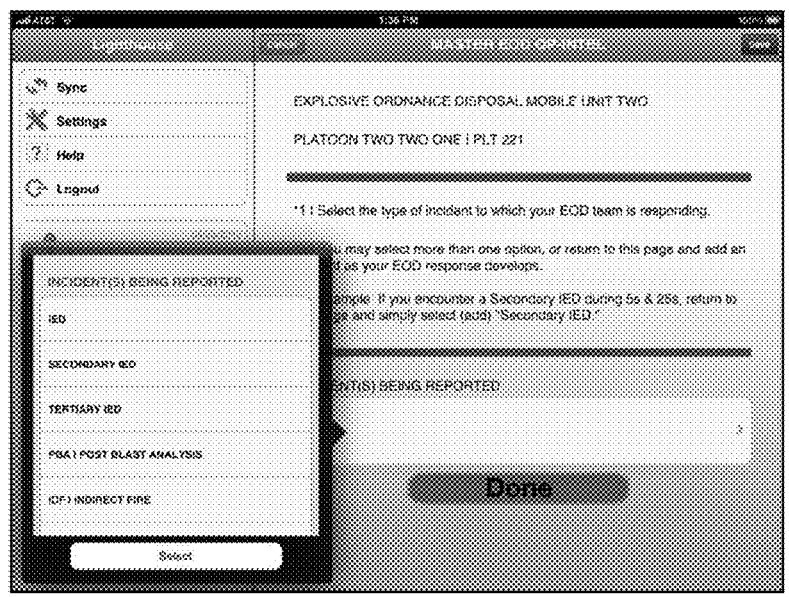

As seen in the screenshot 210 of FIG. 4, the types of reports available to the C-IED operator are presented (e.g., IED, secondary IED, tertiary IED, PBA/post blast analysis, IDF/indirect fire, etc.). Not all of the available reports are shown in the figure. The user can, if necessary, select multiple reports. For example, if the C-IED force encounters a secondary IED during a PBA, the user simply navigates to the homepage (FIG. 4) and selects 'Secondary IED.' Both reports will be generated and catalogued with the same unique identification number, which is further explained in FIG. 19 below. This is important to maintaining data structure for future tactical level component-analysis using the tool 141. The report select list, as seen in FIG. 4, can be loaded with any number of reports. Should a C-IED organization require a report that deals with capturing data on route clearance operations, a separate form can be generated and added.

Figure 5:

Referring also to the screenshot 220 in FIG. 5, the device 100 can be loaded with any portable document format (PDF) file the user requests. FIG. 5 shows an exemplary list of available manuals a user can access when conducting, in this specific case, an IED response. The PDF guides in certain embodiments are embedded within each report-type that is selected. Thus, the user does not need to "back-track" to find the desired guide; they are at the top of each report-type. As the C-IED user navigates the scene of an IED incident, pre or post detonation, the field manuals can be immediately accessed to not only aide in identifying the threat, but also aide in reporting accuracy.

Figure 6:

FIG. 6 illustrates a screenshot 230 showing a unit reporting incident prompting with predefined answers. The exemplary device 100 in this regard is predominantly push-button based, but any suitable form of user interface and prompting/answering approach can be used. FIG. 6 illustrates various exemplary types of unit information that can be immediately available to the user responding to an IED incident, in which the 'Unit Reporting Incident(s)' is developed to provide the responding C-IED force with pertinent unit contact information. Once a unit is selected, the information can include such things as: unit, unit call-sign, radio frequencies, Blue Force Tracker (BFT) role, and the operating base from which the unit originates. Blue Force Tracker (BFT) is a Global Positioning System that allows commanders to track forces across the battlefield. Individual units are assigned a unique BFT role, a unique sequence of numbers and letters that identifies each unit. Having this type of information immediately available allows a C-IED Team Leader to spend more time focusing on mission preparation, including team briefs, team assignments, equipment preparation, mission dynamics, etc.

Figure 7:
Figure 8:
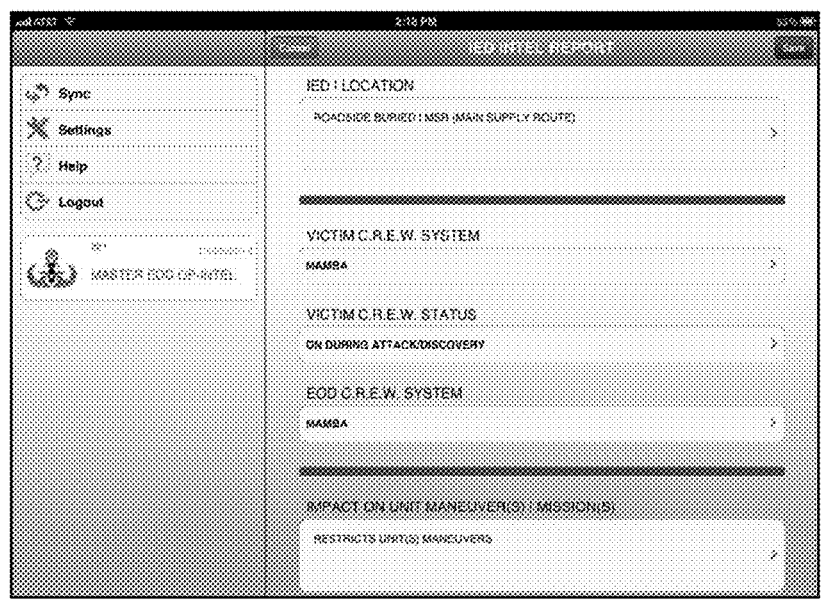
Figure 9:
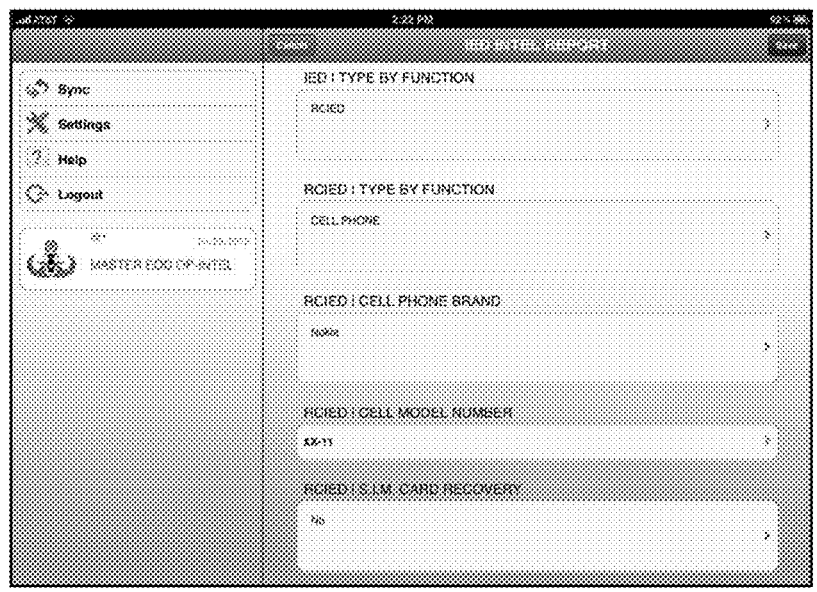
Figure 10:
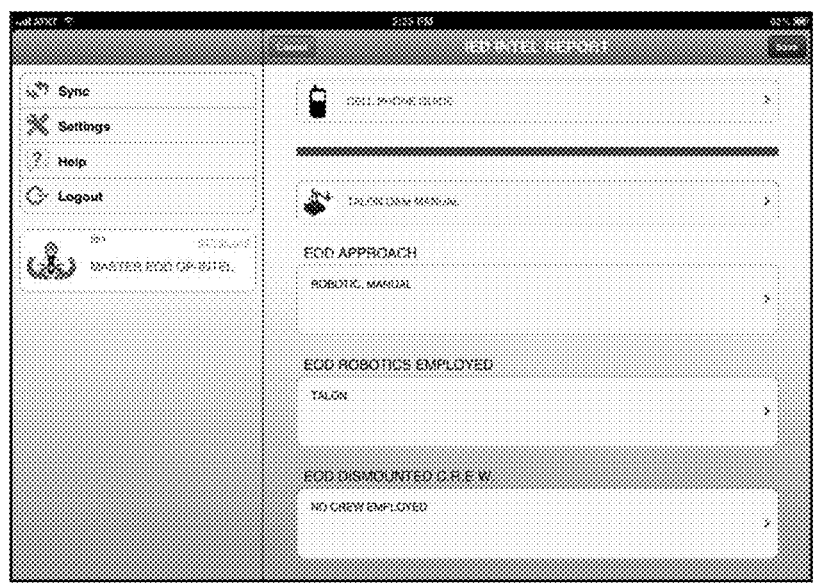

FIG. 7 provides a screenshot 240 showing the user's ability to identify an IED route name (e.g., a major roadway, etc.) and the time the route was last cleared, as well as the type of resources threatened or targeted and whether any personnel were wounded in action (WIA) and/or killed in action (KIA). In addition, the screenshot 250 of FIG. 8 shows entry of the IED location (e.g., roadside buried, main supply route or MSR) as well as entry of IED victim information such as unit identifier, type of mission (e.g., during attack/discovery), and impact on unit maneuvers or mission (e.g., restricts unit maneuvers). FIG. 9 shows a screenshot 260 in which the tool 100 allows the user to enter the IED type by function (RCIED-cell phone in this example), as well as the cell phone brand (e.g., Nokia) and model number, as well as indicating whether or not a SIM card was recovered. The screenshot 270 in FIG. 10 shows another example incident report screen showing prompting and predefined answers for EOD approach (e.g., robotic or manual) and type of EOD robotics employed (e.g., Talon), as well as whether the EOD was dismounted). In this example, the available C-IED guides become immediately available to the user upon selection of report answers, wherein the answer "cell phone" to the prompting for "RCIED|Type by Function" in FIG. 9 calls up a cellular phone guide as shown in FIG. 10, and the use of "Talon" calls up the Talon O&M manual.

Figure 11:
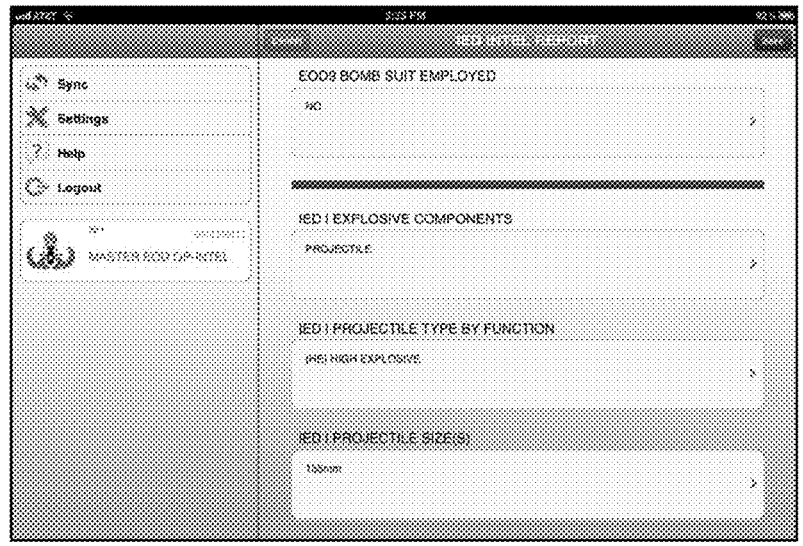
Figure 12:
Figure 13:
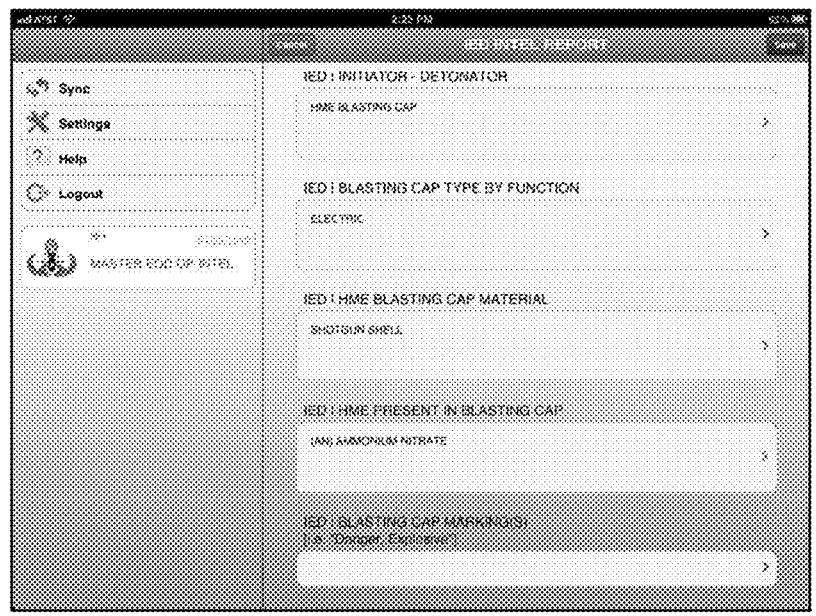
Figure 14:

The screenshot 280 in FIG. 11 illustrates a screen allowing the user to enter whether or not a bomb suit was employed, as well as IED explosive components (e.g., projectile), projectile type by function (e.g., high explosive), and IED projectile size (e.g., 152 mm). In FIG. 12, the screenshot 290 shows the ability to enter the type of projectile fuse (e.g., none, nose well primed with explosive), projectile country of origin (e.g., South Africa) projectile quantity (e.g., 3) and whether the projectiles were daisy chained. FIG. 13 shows a screenshot 300 illustrating the user's ability to enter IED initiator-detonator (e.g., HME blasting cap), blasting cap type by function (e.g., electric), material (e.g., shotgun shell), and HME present in the blasting cap (e.g., ammonium nitrate), as well as any markings on the blasting cap (e.g., "danger, explosive"). The screenshot 310 in FIG. 14 shows prompting by the device 104 brand or serial number, as well as DTMF board brand or serial number, IED safe and arming device (e.g., washing machine timer), as well as photo details and photo intelligence.

Figure 15:
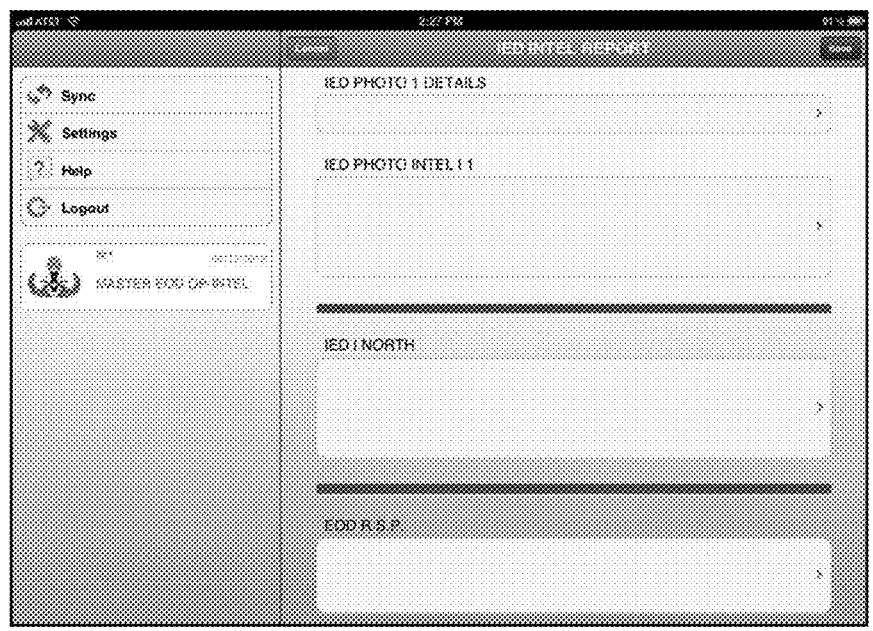

Referring also to the screenshot 320 in FIG. 15, the device 100 may also allow a user to capture images, which are automatically embedded within the report 120 being generated. This eliminates the need for the user to capture images on a separate digital camera. Additionally, this function may eliminate the need for C-IED Team Leaders to remove, compress, label, and attach incident photos, it also eliminates the possibility of a user attaching the incorrect photo(s) to a report. FIG. 15 shows an option to take a photo, and as the user captures an image, the device 100 automatically opens a second photo field, and so on. The same applies to the cardinal directions. Once the northern photo is captured, the option to take the southern photo presents itself, then west, and then east.

FIG. 16 illustrates a screenshot 330 with an "'IED ISite Sketch", by which the user can draw a sketch or drawing for inclusion in the IED report 120. For example, if the user is pressed for time or in need of simply drawing something out for future reference, selecting "Site Sketch" allows the user to quickly draw or write down the necessary notes. In addition, an "EOD Team Leader Report" field is provided, allowing the user to capture a narrative (e.g., speech) or other audio data. For example, at a given IED site, this field can be used to enter a description of something not covered by the predefined prompting information 112. As seen above, the device 100 can be configured with the predefined questions and predefined responses, as well as the supplemental prompting described above, such that most if not all IED component data/structure information can be captured and included in the reports 120 as well as the database 130. FIG. 17 shows a display screen shot 340 with user prompting to enter a photographed view to the east at the IED side, and the device 100 can automatically prompt the user to enter further photos (north, west, south, etc.). The screenshot 350 in FIG. 18 further shows and entered intelligence photograph showing a battery power source for the reported IED.

FIG. 19 illustrates an exemplary IED report data structure 120, including various attributes (corresponding to pre-defined questions prompted by the device 100) and the corresponding user selected response or answer. In this embodiment, moreover, the report 120 does not include any blank fields, and hence only includes attributes or questions for which the user provided (e.g., selected) a predefined answer. In addition to the component/structure data of the report 120, other information is shown, including the type of incident being reported (e.g., IED) location, route name, resources threatened, location information, victim system and status as well as mission impact, etc. It is noted, moreover, that the report 120 in this embodiment is provided in written words and data, and is thus easily discernible simply by reading. In addition, as described below, the analysis tool 141 (e.g., FIG. 1) can advantageously compare one IED report 120 to another in order to essentially compare the component/structural makeup of one IED to another so as to assess relatedness of two IEDs with respect to their construction and components. The completed IED incident report 120 of FIG. 19, moreover, is generated directly by the device 100 and may be stored in the electronic memory 108 thereof for later downloading to the database 130. As reports populate the database 130, they are each assigned a unique identification (ID) number (e.g., S345 in the example of FIG. 19). As reports 120 come in, they are sequentially numbered. Unique identifiers are useful when viewing sub-networks and isolating specific targets. The columns on the left (in bold) are IED network analysis categories or attributes the user navigates during prompting by the tool 100. The columns on the right are pushbutton answers available under each category. For example, when the user selects "IED|TYPE BY FUNCTION", he or she is provided a set of multi-option-select, push-button, universal lexicon answers. Here, the user selected 'VOIED.' After selecting 'VOIED,' the device 100 calls-up a select list of what type of VOIED the EOD team has encountered. Again, in this particular report, the VOIED was a 'CRUSH SWITCH,' and so on and so forth. The report 120 is therefore unambiguous, easy to read, and provides only the data that was collected.

In the illustrated embodiment, the tool 100 is dynamic, and as new threats are encountered, data fields can be rapidly added to the prompting information 112 and populated with additional fields, as required. For example, if there is a new type of IED initiator discovered, a field can be added to the information 112 that reflects this new intelligence. If this new IED initiator is encountered again, the device 100 will have a category for the user to select, with pre-populated answers. In practice, moreover, such updates can be replicated to all the user devices 100, whereby each device 100 is equipped with the latest information and prompting screens 112.

The device 100 can provide the IED reports 120 in various data formats. For network analysis purposes, a common separated value (CSV) format is particularly advantageous, but not a strict requirement of the present disclosure. CSV data is completely structured and consistent, allowing analysts to import the data into programs that allow for rapid illumination of IED networks as a whole, and then begin the process of isolating sub-networks based on various IED attributes. FIG. 20 shows a numeric report format 400 including data in a spreadsheet format. This format, however, requires a separate code book allowing users to decipher what the numbers in the columns mean.

By structuring IED component data reports 120 and the collection thereof in the database 130 in a way that allows for streamlined importation into an analysis tool 141, analysis can be conducted that identifies potential bomb-making cells, for example using SNA techniques. This allows analysts to drill-down on specific sub-networks of interest within the larger IED networks, and allows analysts to identify smaller geographic areas of interest. Identifying specific sub-networks of interest and reducing the geographic areas of interest are particularly powerful because of the potential to focus C-IED efforts on IED subnetworks that are deemed higher priority by ground force commanders and potentially narrowing the sheer size of the areas that should be focused on to attack these networks.

The inventors have appreciated that IED bomb-making cells can be identified by the ways that they combine the multitude of available components, where identifying IED sub-networks by utilizing component-level analysis makes it possible to identify potential bomb-making cells, or IED cells that are sharing the knowledge and techniques of a bomb-maker that is training others in IED fabrication methods.

Referring also to FIGS. 21-40, an exemplary network of 237 separate IED incidents is illustrated, each with a separate report 120 generated using the apparatus 100, filed into the structured database 130. Analysis begins by using the analysis tool 141 on the computer 140 to access the database 130 and to import the combined reports 120 into a program 141. In one possible implementation, the analysis tool 141 uses Organization Risk Analyzer (ORA) application software, developed at the Carnegie Mellon Center for Computational Analysis of Social and Organizational Systems (CASOS). ORA is a dynamic meta-network assessment and analysis tool 141 with hundreds of social network, dynamic network metrics, trail metrics, procedures for grouping nodes, identifying local patterns, comparing and contrasting networks, groups, and individuals from a dynamic meta-network perspective. ORA has been used to examine how networks change through space and time, contains procedures for moving back and forth between trail data (e.g. who was where when) and network data (who is connected to whom, who is connected to where . . . ), and has a variety of geo-spatial network metrics, and change detection techniques. ORA can handle multi-mode, multiplex, multi-level networks. It can identify key players, groups and vulnerabilities, model network changes over time, and perform COA analysis.

The analysis tool 141, moreover, can directly import data files or reports 120 in 'plain English,' thereby negating the necessity to code attribute data with numerical values as in the example of FIG. 20. In contrast, the data format 410 in FIG. 21 provides a plain-English dataset produced by the tool 100, which does not require a code book, and which can be read by a human interpreter as well as the ORA software tool 141.

Figures 22, 23:
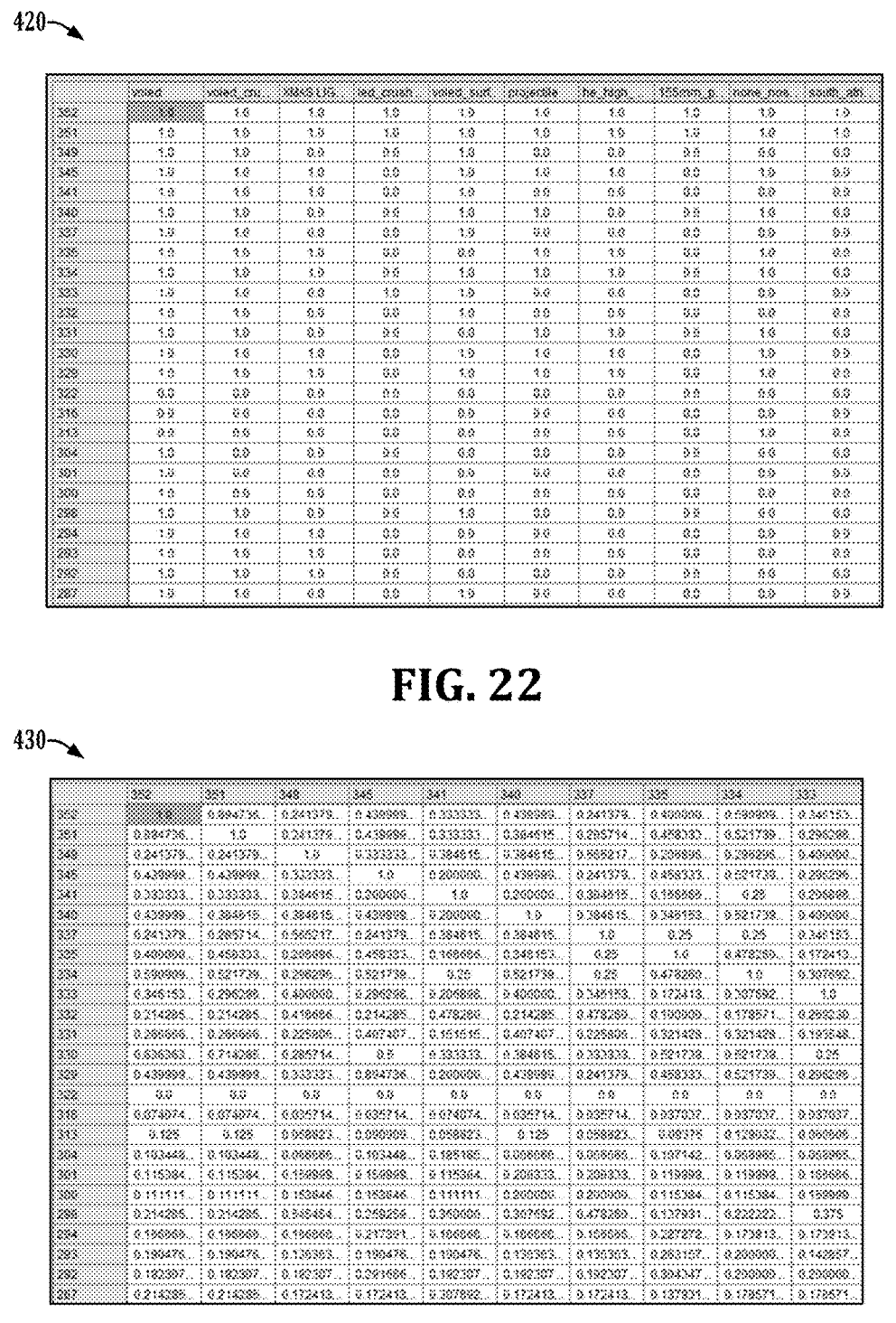

Once the data reports 120 are imported into the analysis tool 141, a social network analysis (SNA) component 142 (FIG. 1) is used to analyze the data using adjustable similarity correlation via component 144, as well as a filtering component 146 and visual renderings such as "sociograms" generated by a rendering component 148. The tool 141 initially creates a 'new' network using a Similarity Correlation (SC) component 144 (FIG. 1). Prior to performing the SC function, the network is an 'Agent by Resource' or 'IED by Attribute' network. FIG. 22 shows a table 420 representing this format, in which each IED incident report number is shown in the left-most column, and the attributes available to be assigned to it are shown across the top row. If the attribute column for a particular IED incident has a value of 1.0, it has that attribute; if it has a value of 0.0, it does not. It is noted that the table 420 in FIG. 22 is only a small piece of the much larger network in this example (237 IED incidents). In addition, the illustrated attributes listed across the top row are but a few of the total attributes potentially assigned to IEDs during the on-scene data collection and report building process using the device 100. Fitting the entire network into a readable, embedded graphic would be impractical in certain cases. The table 420 in FIG. 22, however, illustrates the differences between the 'IED by Attribute' network and the subsequent network that is generated during the SC calculation.

Figure 24:
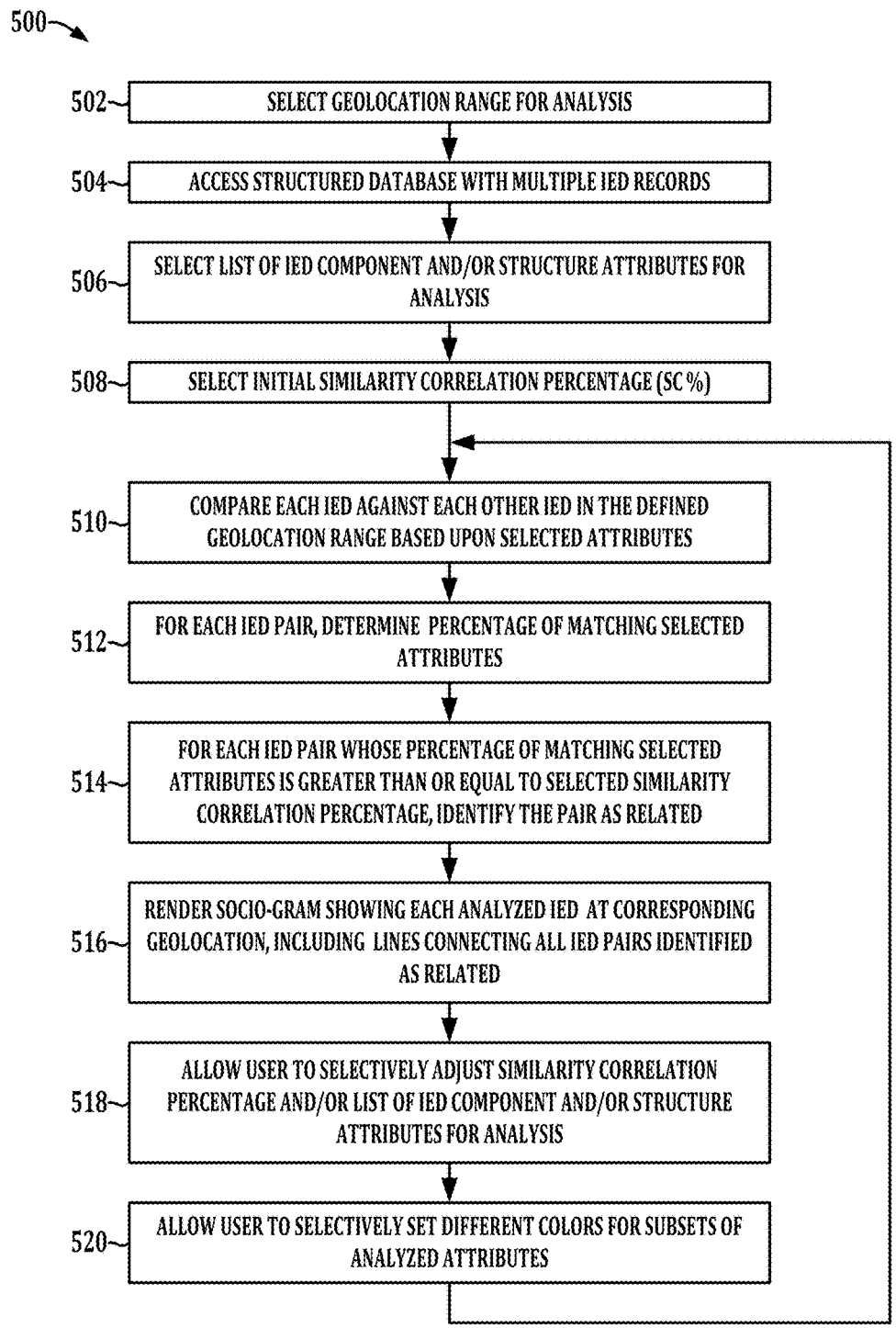
FIG. 24 is a flow diagram illustrating an exemplary process for analyzing a structured IED report data set for identification of IED networks in accordance with further aspects of the present disclosure.

FIG. 24 illustrates an IED network analysis process 500 which may be implemented in the analysis tool 141 executed by the computer 140. At 502 in FIG. 24, a geolocation range is selected for analysis, thereby defining which records or reports 120 are to be analyzed. The analysis tool 140, in one implementation, may selectively exclude certain reports 120 that do not fall within the geolocation range selected at 502. In another possible embodiment, the tool 141 accesses the structure database 130 at 504 and obtains only the reports 120 pertinent to the selected geolocation range. At 506 in FIG. 24, a list of IED component and/or structure attributes is selected for analysis. For example, as previously discussed, attributes that do not pertain to IED components and/or structure may be excluded at 506 by the selection of the attributes to be used in the analysis. At 508, an initial similarity correlation percentage (SC) is selected.

Referring also to the table 430 in FIG. 23, the similarity coefficient component 144 compares each IED in the network against every other IED in the network at 510 in FIG. 24, based upon attributes selected at 506. In this manner, each record or report 120 is compared against the other reports 120, where each IED in the network has attributes defined by the report 120 generated on-scene. While all of these attributes are important data points for analysis and the ability to whittle away at the sub-networks of interest, some of them are not relevant to the physical makeup of the IEDs. Since the ultimate goal of the similarity correlation function 144 is to identity potential bomb-making cells, it is important to properly select which attributes are incorporated into the similarity correlation function 144 at 506 by focusing on the physical attributes of the IEDs and ignoring the attributes that are not relevant. Specifically, physical components of the IEDs, e.g. explosive type, IED TBF, power source, initiator/detonator, etc, are selected to incorporate into the similarity correlation analysis. However attributes such as the unit responding to the IED call, the intended target of the IED and the CREW system used by EOD responders are not relevant to the SC function, and can therefore be excluded from the calculation.

After the SC function has been run at 510, a new network is created, as shown in FIG. 23. At 512 in FIG. 24, for each pair, a percentage of matching selected attributes is determined. Whereas the previous network (FIG. 22) was an 'IED by Attribute' network, the newly formed network in FIG. 23 is now an 'Agent by Agent' or 'IED by IED' network. In this new SC network table 430, the left-most column still represents IED incident reports, but the top-most row now also represents IED incident reports, and shows the similarities between IEDs. Each IED is assigned a number between zero and one for every IED it is compared with. This number represents the overall similarity of any two compared IEDs. The closer the number is to 1.0, the more alike those two IEDs are; the closer to zero, the less alike they are. Consequently, the number associated with the comparison of two IEDs in the table of FIG. 23 represents the percentage of matching selected attributes determined at 512 in FIG. 24.

At 514, for each pair whose percentage of matching selected attributes is greater than or equal to the selected similarity correlation percentage (SC), the pair is identified as "related". A visual rendering (e.g., sociogram) is then created at 516 showing each analyzed IED at the corresponding IED geolocation, with lines being included to connect all IED pairs identified at 514 as being "related". In this regard, although the table output of FIG. 23 is useful, visually rendering the analysis at 516 facilitates the goal of 'seeing' the IED networks that C-IED forces are attempting to attack. In one possible implementation, the standard model for visualizing networks, i.e., the sociogram can be used, although other forms of visual renderings can be employed. Sociograms can be structured in many different ways to yield different perspectives on network structure, but at its basic level a sociogram includes nodes and lines connecting them. When applying component-level analysis 142, the nodes represent individual IED incidents at the corresponding geolocation, and the lines connecting them represent a minimum value of similarity, as expressed by a number between zero and one, or converted to a percentage, that is the result of the SC calculation and comparison at 510-514.

Based on this visual rendering, the user is allowed to selectively adjust the SC percentage at 518, and may also adjust the list of IED component and/or structure attributes for further analysis. In certain embodiments, moreover, the user is allowed to selectively set different colors at 520 for subsets of analyzed attributes. The process 500 then returns to 510 as described above, and the user may initiate one or more adjustment/analysis iterations in order to identify one or more potential IED networks for further action.

Figure 25:
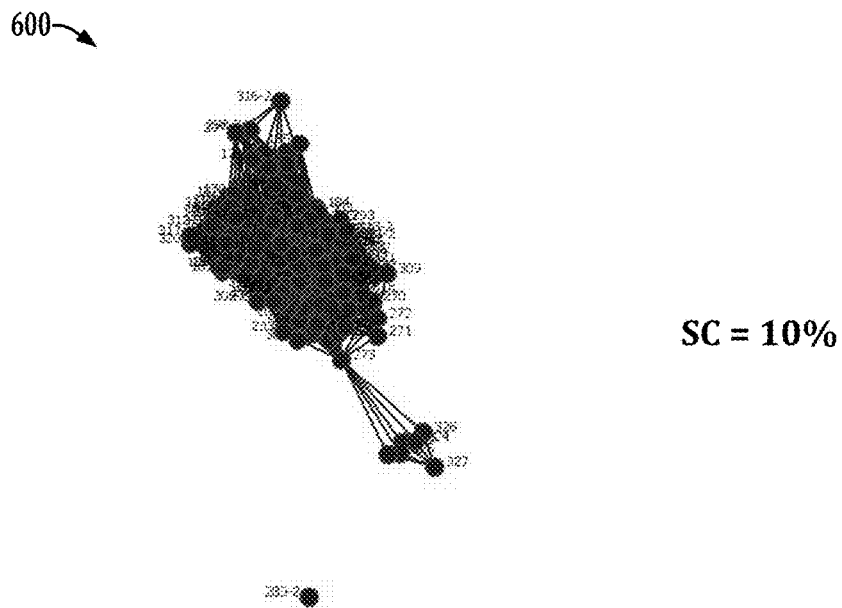
FIGS. 25-28 are exemplary analysis tool screenshots of exemplary sociograms showing IED locations and associations between IEDs at different similarity correlation settings.
Figure 26:
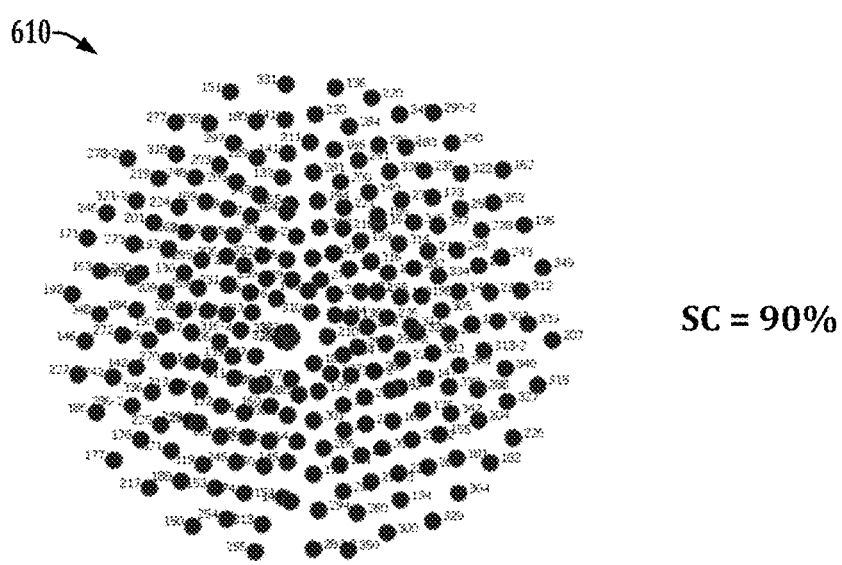

Referring also to FIGS. 25-40, the network analysis tool 141 allows the user to set the value of the SC at which the program 'ties' together any two IEDs, thereby allowing an analyst to add or remove ties within the network. To better visualize this process, FIGS. 25 and 26 show the example IED network of 237 separate IED incidents at two very different SC values. FIG. 25 shows a rendering 600 of the network at an SC setting of 10%, whereas an SC setting of 90% is used in the rendering 610 of FIG. 26. Thus, in FIG. 25, a line between any two IEDs indicates that they share at least 10% of their physical components in common, and a line in FIG. 26 means that the connected IEDs share at least 90% of their physical components in common. However, as can be seen in FIG. 26, almost none of the IEDs share that level of component commonality.

After a brief visual inspection of the sociograms in FIGS. 25 and 26, the user may adjust the similarity coefficient percentage Sc. If the SC is set too low, as in FIG. 25, all of the IEDs in the network are connected, and it is difficult to ascertain any indication of an IED network in the rendering 600, and thus provides no insight or ability to focus on a sub-network of interest. Likewise, if the SC is set too high, as in FIG. 26, all of the IEDs in the network are disconnected, whereby this rendering 610 also fails to provide an analyst with any valuable information about the network. However, the analysis tool 141 advantageously allows an analyst to very rapidly adjust the value of the SC up or down, with the system rendering a new graphical image of the analyze geolocation and the IEDs thereof after each adjustment. The goal of this manipulation is to yield clusters of IEDs that are closely related (as indicated by the lines in the graphical renderings) without falsely tying together IEDs that are unrelated, or shattering the network to the point where no subnetworks of interest can be identified.

Figure 27:
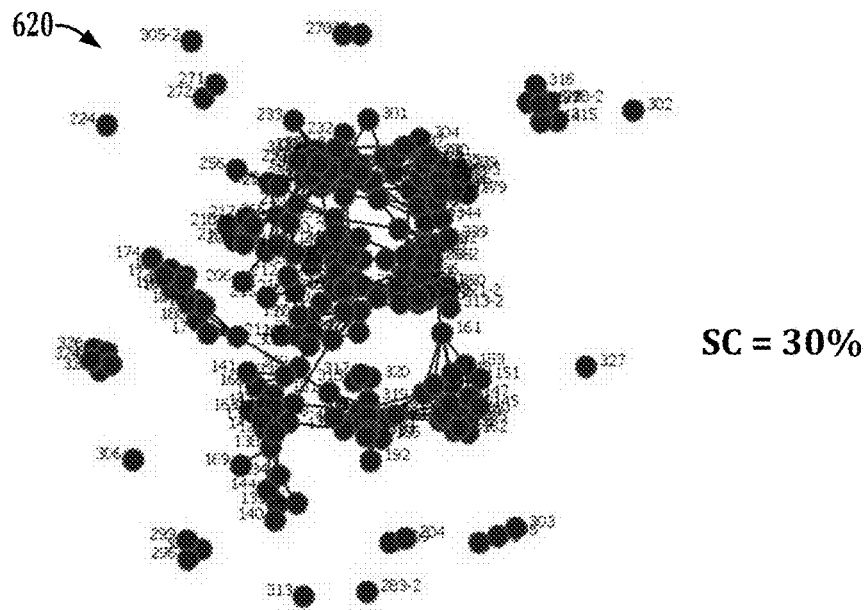
Figure 28:
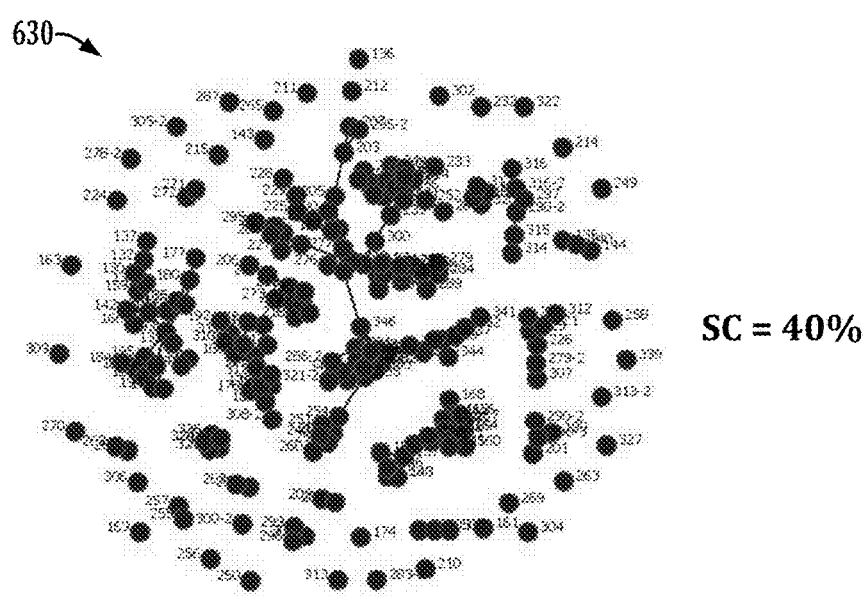

FIGS. 27 and 28 illustrate examples of this selective adjustment. FIG. 27 shows a rendering 620 of the network with the SC set at 30%, and the rendering 630 in FIG. 28 shows an SC setting of 40%. In certain implementations, using ORA for example, the network visualizer may not allow similarity correlation percentage adjustment with more precision than ten percentage points at a time, but further fine-tuning of the SC threshold is still possible in order to maximize the clustering of 'related' IEDs while also ensuring that IEDs are not linked together that should remain separate (false-positives). For example, the ORA main screen may allow a user to view and edit networks in their tabular format. In order to fine-tune the SC in this case, the user can selectively remove values below a certain threshold, for example by using the ORA 'Editor' function of the 'IED×IED' network that was created during the SC calculation. Because the previous Sc adjustments of FIGS. 27 and 28 show that the optimal SC value lies somewhere between 0.300 and 0.400, this tool can be used to remove values lower than 0.350, 0.325, and 0.375 in three repetitions of the process, yielding three new network sociograms.

Figure 29:
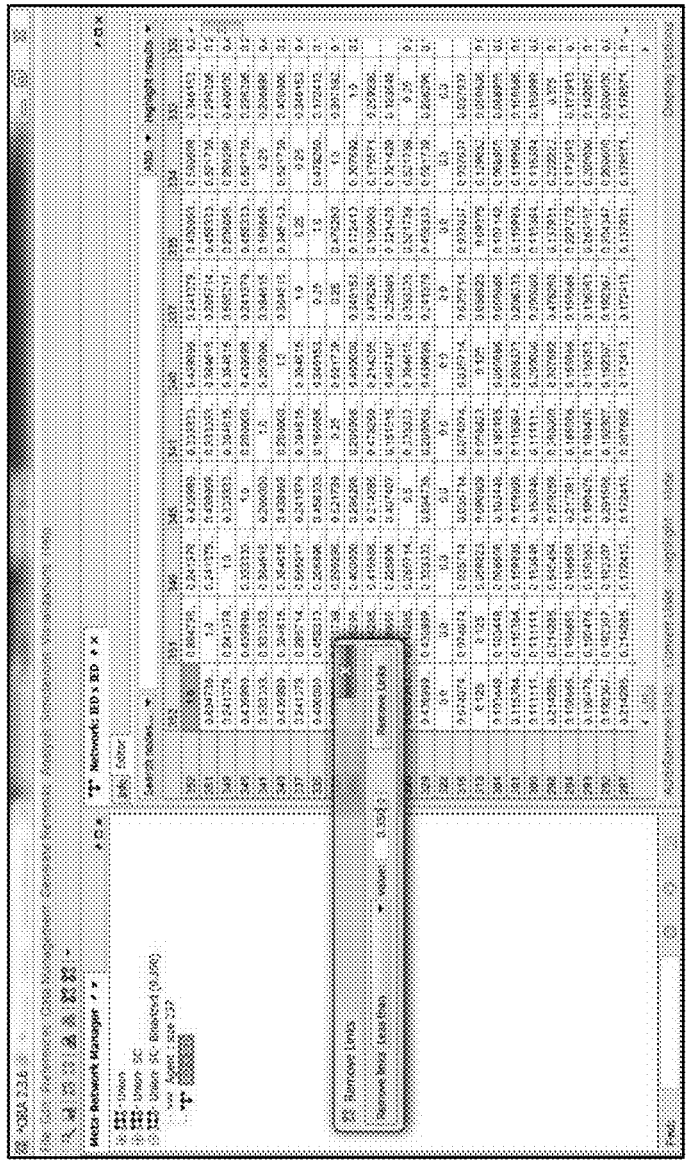
FIGS. 29-31 are exemplary screenshots of IED by IED data tables.
Figure 30:
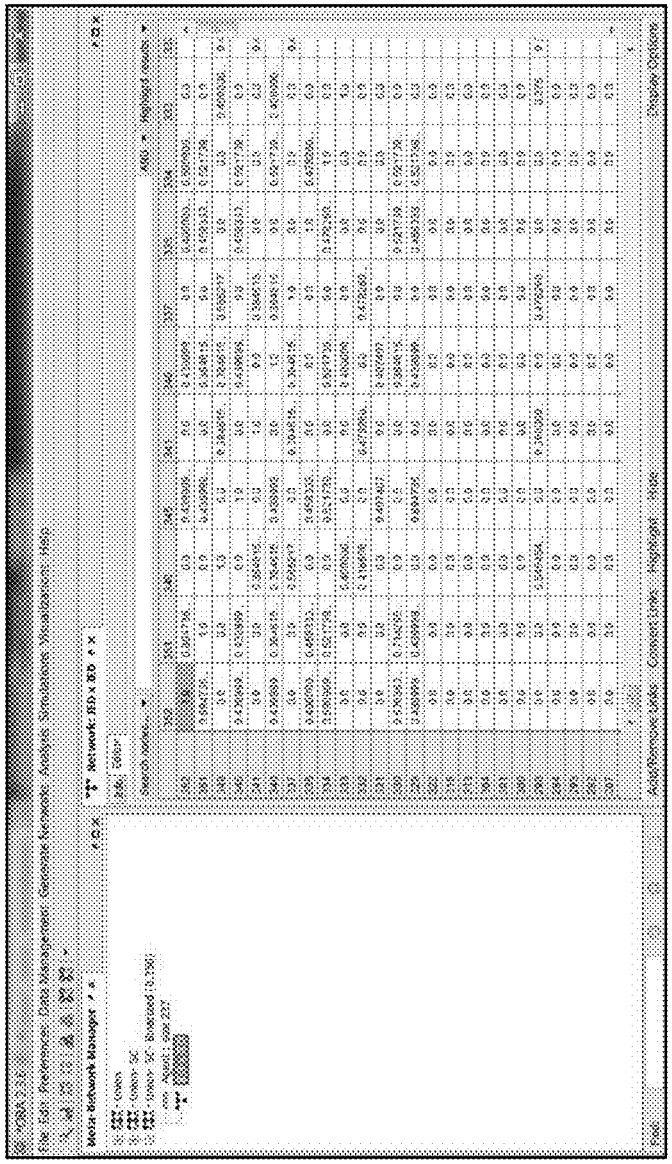
Figure 31:
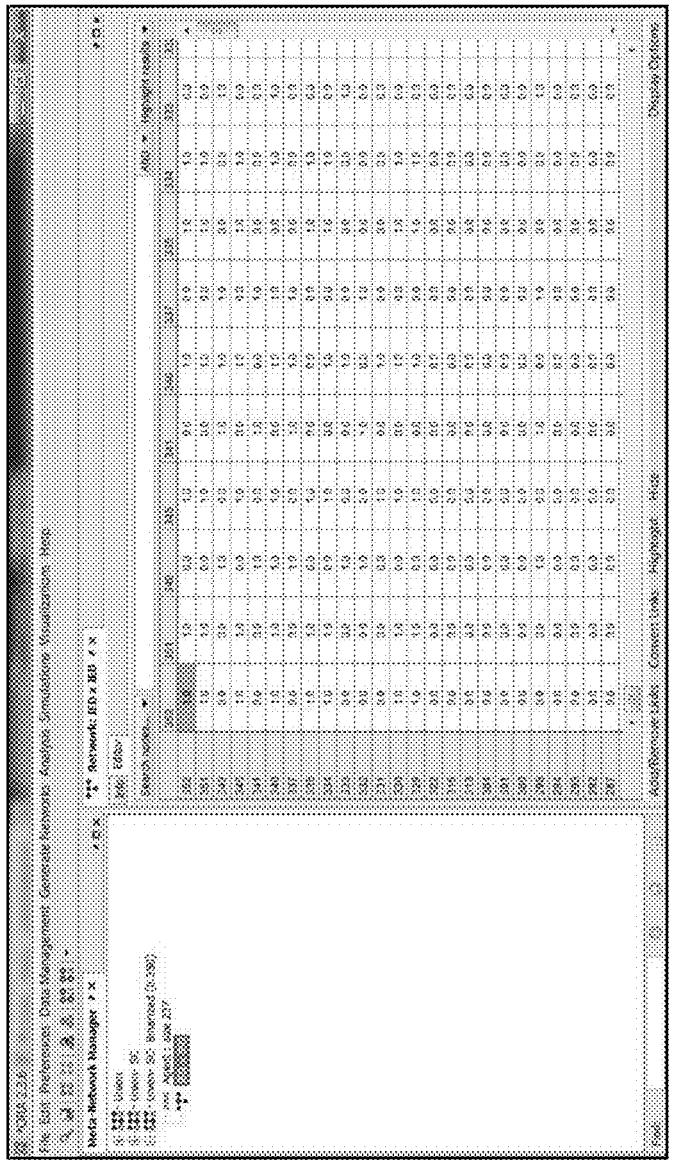

FIG. 29 illustrates the table rendering 640 to show this adjustment process in the ORA main screen for the first iteration. In this case, the user employs the analysis tool 141 to remove all values of links lower than SC=0.350. This will yield a network that only draws ties between any two IEDs that share at least 35% of their physical components in common. FIG. 30 illustrates another step in the rendering 650, in which the new network has been renamed in order to keep track of the changes made and the specific SC values. Additionally, ORA is used in this case to binarize the values within the tabular network, so as to reduce the necessary processing power of the computer being used by converting any value greater than, or equal to, the user-defined SC value to a 1.0. The new binarized tabular network 660 is shown in FIG. 31. It is further noted that the goal is to visually inspect the networks for clustering and fragmentation, and to find the point where 'related' IEDs cluster together, but the SC value is just below the point where the network begins to significantly fragment.

Figure 32:
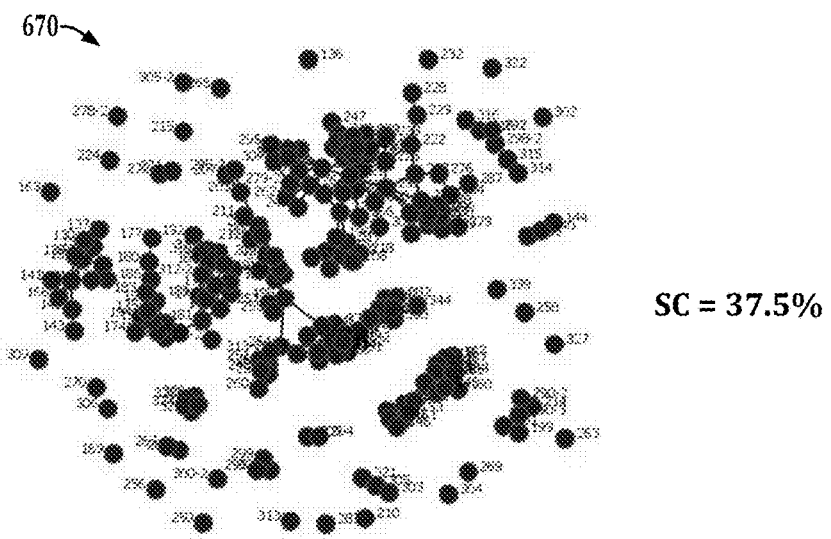
Figure 33:
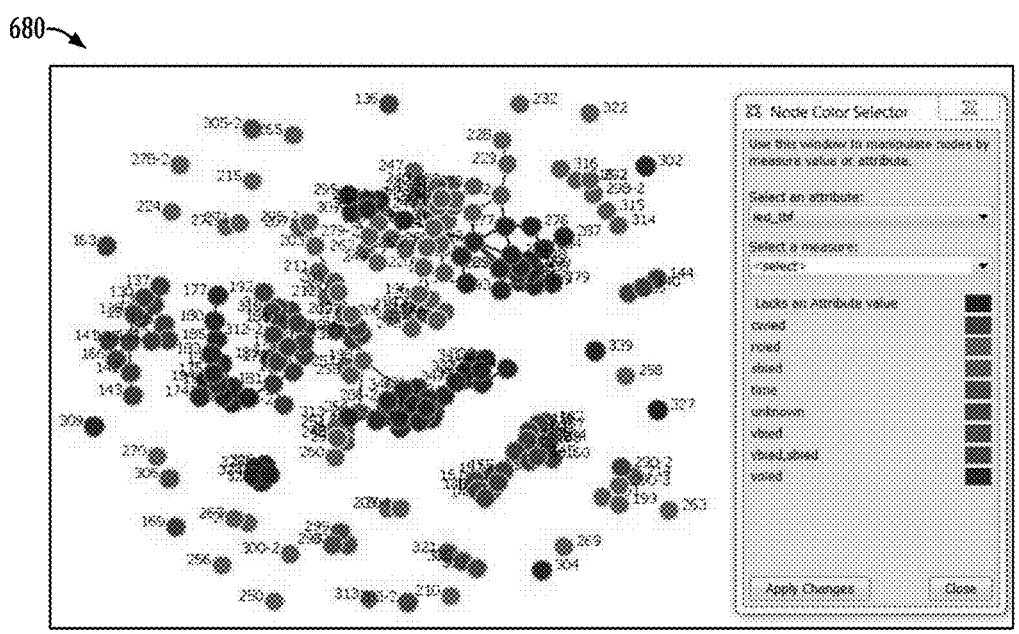

In this case, the sociogram that results from a SC value of 0.375 (SC=37.5%) offers a good balance of clustering and fragmentation, as shown in the rendering 670 of FIG. 32. The result of FIG. 32 provides an appropriate starting point for subsequent analysis. Specifically, the goal of component-level analysis is to focus on sub-networks of interest by rapidly filtering for specific physical components and similarities within the larger IED network. It is at this stage in the process that the user can begin to apply filters and demonstrate some of the capability and value that results when properly structured data is imported into programs like ORA. FIG. 33 illustrates allowing the user to selectively set different colors for subsets of analyzed attributes (e.g., 520 in FIG. 24). It is noted that color selectivity in this regard includes shading selectivity, wherein the user may be allowed to set different shades for the depicted IEDs based on different analyzed attributes in this filtering process. In this regard, it may be beneficial to select filtering attributes that apply to the entire network, such as TBF or explosive type, although the user can select any attribute associated with the data records 120 for such filtering. Selecting attributes that only apply to a small subset of the network, such as specific components that only appear in remote-controlled IEDs (RCIED), may not be useful at this stage but can be adjusted or filtered later in the process, for example, after a sub-network of interest has been identified. With this in mind, an analyst can use this network analysis tool 141 to color nodes by specific attributes, which yields valuable visual feedback nearly instantly.

As seen in FIG. 33, for instance, the tool 141 has been used to color the nodes of the 37.5% SC network according to IED type by function (TBF). Thus, the nodes for the different values of this attribute (CWIED, RCIED, SBIED, TIME<UNKNOWN<VbIED, VBIED/SBIED and VOIED) are colored or shaded differently as shown in the figure. The resulting sociogram now begins to lead the user towards identifying a specific sub-network of interest to focus on for more detailed analysis. The tool 141 thus rapidly shows the user, through a simple visual inspection, that the largest clusters come from three different IED TBFs: RCIED, command-wire IED (CWIED) and victim-operated IED (VOIED), and can be represented by user-distinguishable colors or shades (e.g., yellow, orange and blue in one implementation).

Figure 34:
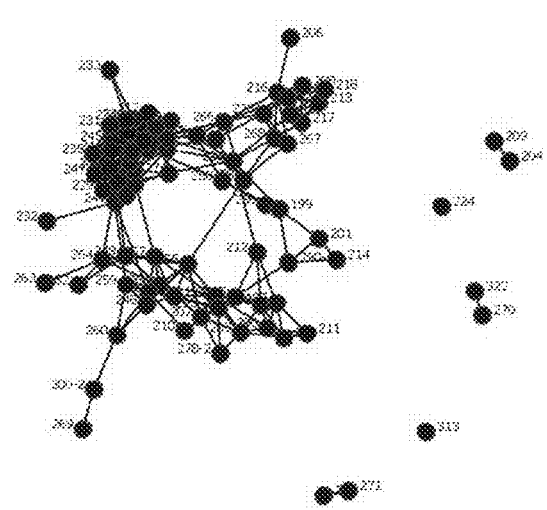
Figure 35:
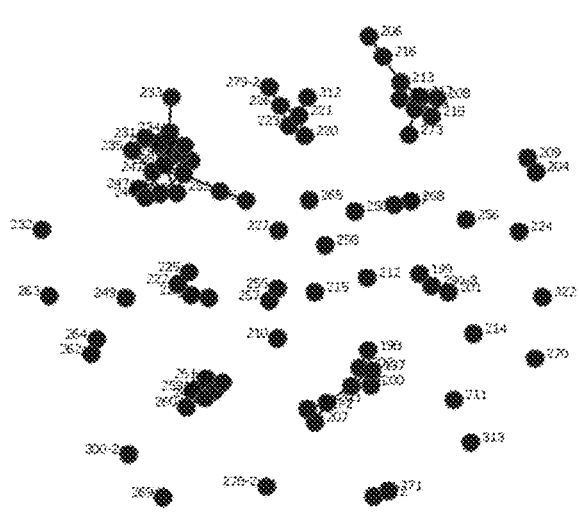

Referring also to FIGS. 34 and 35, at this stage, an analyst can choose one subset of IED TBFs to focus more detailed analysis. Therefore, it is a matter of simply removing the nodes that are not of interest and recalculating the SC to further identify clusters of potential bomb-making cells within the smaller sub-network. This can be done with any of the three IED TBFs identified as candidates above. The examples chosen to illustrate the effectiveness of component-level analysis are not meant to be all-inclusive, but rather to show the ability to rapidly filter through large numbers of attributes and focus network analysis on the smaller sub-networks of interest.

After using the tool 141 to remove all of the IED incidents that are not RCIEDs, the user can again visualize the smaller RCIED sub-network in sociogram form. As previously mentioned, the goal of focusing on sub-networks is to pull the value out of a large dataset. In this instance, the RCIED sub-network is now only 85 separate IED incidents as opposed to the 237 incidents that made up the initial network. This can be seen below, in FIGS. 34 and 35, where the rendering 690 in FIG. 34 shows a similarity correlation of 30% and the rendering 700 in FIG. 35 shows the network for an SC of 40%. Adjustment of the SC value shows that there is a point somewhere between the SC values of 0.300 and 00400 where the RCIED sub-network begins to significantly fragment, resulting in too many isolated nodes. With the value thus bracketed, the user can further adjust the SC value more precisely in an effort to find a percentage value that achieves a good balance of clustering and fragmentation and directs analytical efforts at identifying a more-specific sub-network of interest.

Figure 36:
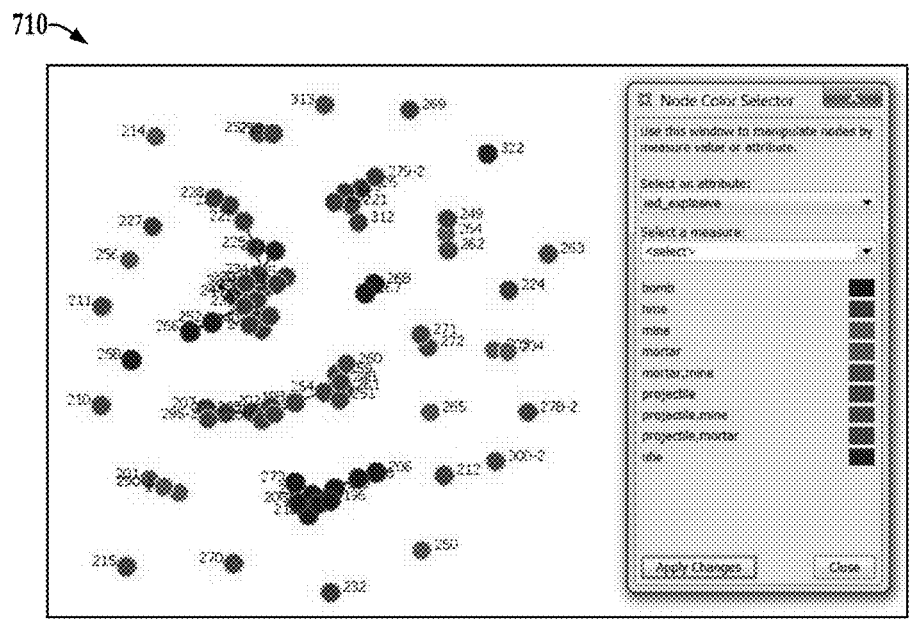

FIG. 36 shows a rendering 720 at a similarity correlation SC value of 0.385, or 38.5%. As specific sub-networks of interest are identified and analyzed, it is also important to increase the SC value to ensure that false-positives are not being drawn. Put another way, as analysis focuses on the IED sub-networks that share a TBF or specific components in common, the IEDs in those sub-networks will inevitably be more alike, so the SC value will likely need to increase to compensate for the increased commonality of the depicted IEDs. In addition, after isolating the specific SC value which exhibits a good balance of clustering and fragmentation, the user can color the nodes by the type of explosive within the particular IEDs (e.g., according to another higher granularity attribute), such as home-made explosives (HME) or types of unexploded ordnance (UXO), like bombs, mines or projectiles. The result of this coloring adjustment is shown in FIG. 36 for IED explosive type.

Figure 37:
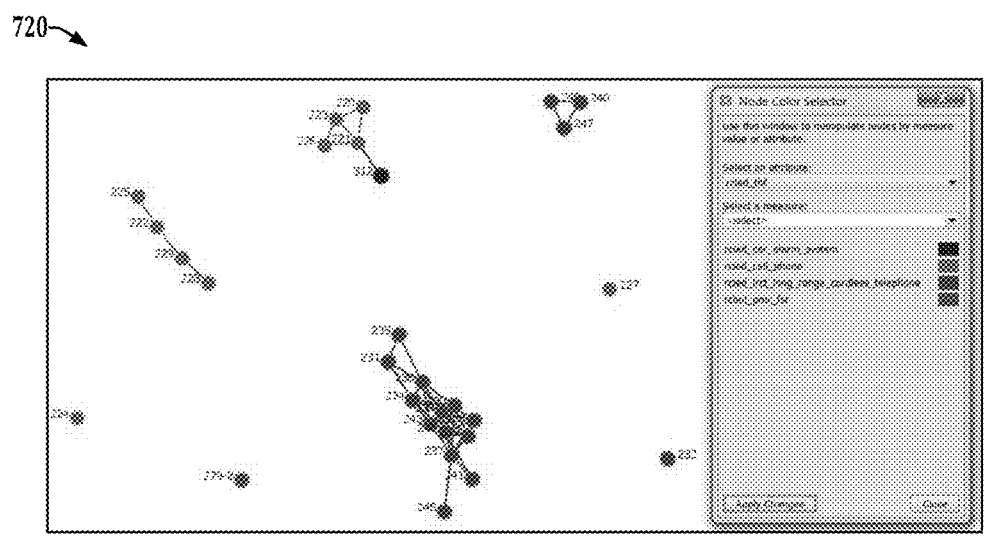

Referring also to FIG. 37, the user can also select one of the three RCIED sub-networks to further analyze. In this particular example, the user further focuses on the RCIED HME sub-network, and thus removes the nodes that are not of interest, in order to visualize the RCIED HME sub-network to see what type of value it provides. The rendering 720 in FIG. 37 shows the resulting sociogram of the RCIED HME sub-network, with the SC value now boosted to 42.5% and the nodes colored according to RCIED TBF, e.g. car alarm system, cell phone, long-range cordless telephone (LRCT), personal mobile radio (PMR).

As seen in FIG. 37, this sub-network is now just 29 separate IED incidents, a much more manageable number to work with than the initial 237 nodes, particularly when attempting to compare the component-level analysis being shown here with other sources of intelligence such as HUMINT, SIGINT or biometrics. However, it is possible to whittle down this number even further by isolating the remaining IEDs based on other attributes. This may not be necessary, but situations may occur where a ground-force commander needs more specific detail to focus on, or where conditions on the ground guide analysis in that direction. For example, FIG. 37 shows that the largest cluster within the RCIED HME sub-network is composed of IEDs that utilize LRCTs as the switch to trigger the IED explosion. It may be of further interest to identify the brands of LRCTs used in this network as well as to determine whether the IEDs in this sub-network are having success. With properly structured data imported into the analysis tool 141, an analyst can answer these questions in a matter of minutes by simply coloring the nodes by specific attributes. The rendering 730 in FIG. 38 shows how an analyst could answer the first question by simply coloring the nodes in the RCIED HME LRCT sub-network according to LRCT brand. As seen in FIG. 38, the RCIED HME LRCT sub-network does not favor any particular brand of LRCT. This may not seem to add any particular value to an understanding of the network, but that is not necessarily the case. In actuality, this tells the user that there is no need to focus on a particular tactic to attempt to identify or attack a particular supply chain in an effort to hamper bomb-building capacity. Without this form of analysis, an analyst would need to read through the 17 separate reports regarding the RCIED HME LRCT incidents to answer this question, a process that would take considerably longer depending on the length of the reports and the analyst's ability to sort through the database and find them quickly.

Answering the second question regarding the effectiveness of this particular sub-network by utilizing the analysis tool 141 is also fairly simple, wherein a measure of IED network effectiveness is a comparison of IEDs found and cleared versus IEDs that exploded. Using the system 141 to color the nodes in this network by the 'incident being reported' attribute gives the user that data, again in a matter of minutes, as seen in the rendering 740 of FIG. 39. This shows the RCIED HME LRCT network colored by that attribute, and makes it instantly apparent to the user that 11 of the 17 IED incidents were PBA responses, meaning that those IEDs had already exploded. FIG. 39 thus shows the 17-node RCIED HME LRCT subnetwork with the SC set to 42.5%, and the nodes colored by the type of incident being reported. In this sub-network, 64% of the IEDs are exploding and only 36% were found and cleared. Compared with the larger overarching network statistics of 55% of IEDs exploding and 45% found and cleared, this sub-network is more successful against efforts to find and clear IEDs. Comparing this with the overall IED network numbers, where 131 of the 237 incidents were PBA responses and it is evident that this network is having much greater success at preventing C-IED forces from finding and clearing these types of IEDs. More specifically, 64% of the RCIED HME LRCT sub-network yields explosions, or only 36% are found and cleared. In the larger overarching IED network, only 55% of the IEDs resulted in explosions with 45% being found and cleared. Answering this type of question without having the ability to rapidly sort through the various attribute data would take considerably more time and effort, as it would entail comparing the smaller sub-network against the larger overarching IED network as a whole by returning to the database, pulling the relevant data out of that database, and importing it into a program that would allow some level of statistical analysis.

Figure 40:
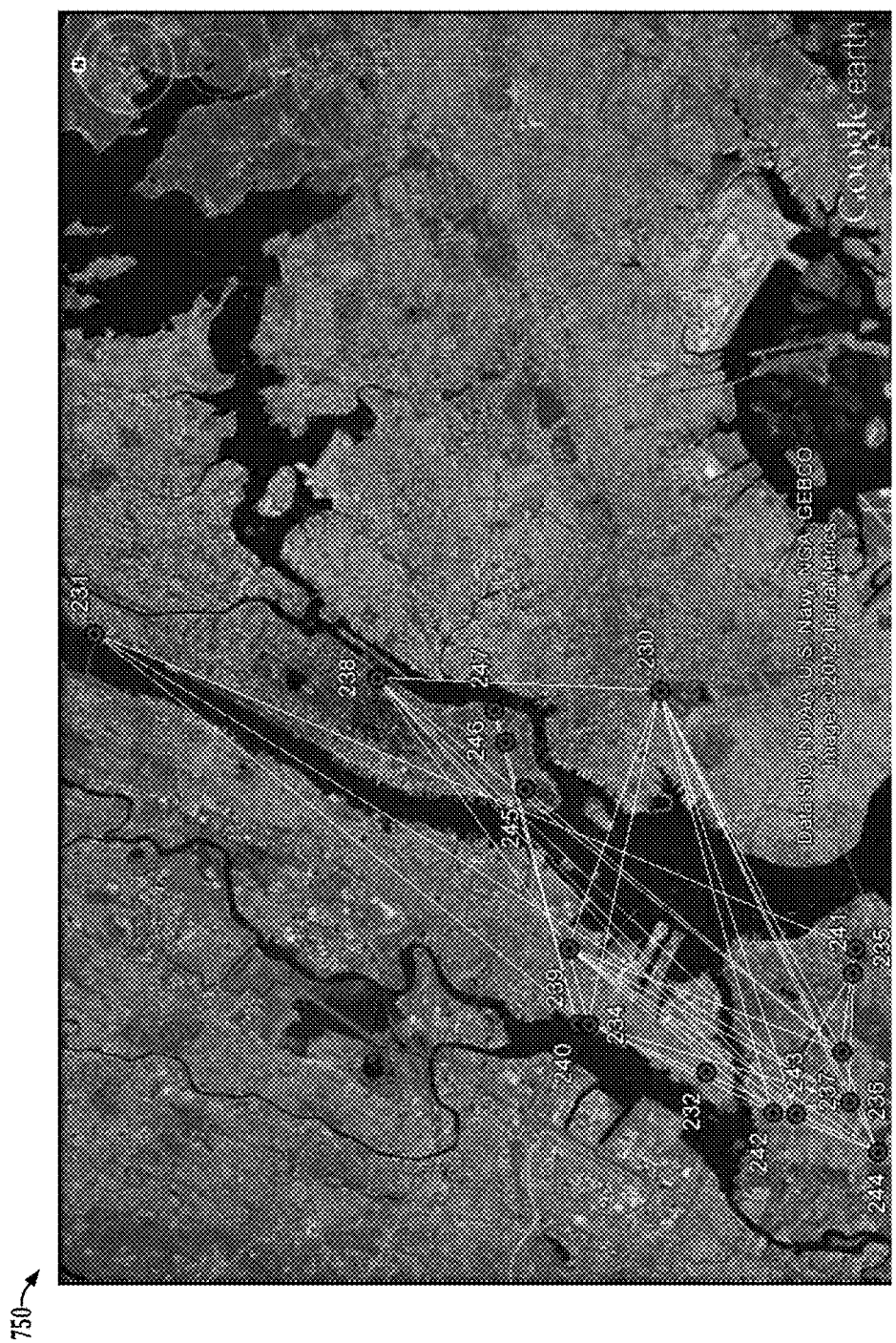
FIG. 40 is a screenshot showing a sociogram of an identified IED network superimposed over a map in the analysis tool.

Referring also to FIG. 40, a rendering 750 is depicted showing superposition of the sociogram over a map or satellite image using the analysis tool 141. As seen, it is useful to visualize identified or analyzed IED networks geospatially. For example, ORA allows users to export these networks in files that are compatible with a wide variety of geospatial visualization tools, such as Google Earth and Geographic Information Systems (GIS). GIS tools like ArcGIS are extremely powerful mapping and geospatial analysis tools, but require fairly extensive knowledge to use properly. For this reason, Google Earth interface may be preferable. The ultimate goal of visualizing the IED sub-network of interest is to narrow the geographic area of interest. Attempting to craft an appropriate network attack strategy is much more difficult when dealing with a 256 square mile AO than when given the capability to narrow that focus to a 10-15 square mile AO. The refined geographic area of interest will be different for each sub-network of interest, and it may not always be possible to achieve such a drastic minimization of the area of interest, but it will always be worthwhile to attempt to narrow the focus to a smaller region. FIG. 40 shows the first step in that process, after the RCIED HME LRCT sub-network has been converted to a Keyhole Markup Language (KML) file and imported into Google Earth.

It will be understood that many additional changes in the details, materials, procedures and arrangement of parts, which have been herein described and illustrated to explain the nature of the invention, may be made by those skilled in the art within the principal and scope of the invention as expressed in the appended claims.

The following is claimed:

1. An improvised explosive device network analysis apparatus for acquiring and assembling improvised explosive device (IED) data, comprising:
    at least one processor operatively coupled with and configured to operate a user interface and to receive geolocation information associated with a current position of the apparatus;
    an electronic memory operatively coupled with the at least one processor, the electronic memory storing an IED network analysis component including prompting information including predefined questions and corresponding predefined answers with respect to at least one of IED components and IED structure and including instructions for displaying prompting information and receiving user inputs and geolocation information and for generating and storing IED reports;

a user interface operated by the at least one processor rendering at least some of the prompting information to a user and receiving user selected predefined answers to at least some of the predefined questions;

the at least one processor executing instructions included in the IED network analysis component to convert the geolocation information associated with the given IED and user selected answers associated with the given IED into a predetermined uniform terminology;

the at least one processor executing instructions included in the IED network analysis component to generate one or more IED reports individually associated with a given IED, wherein individual IED reports include the geolocation information associated with the given IED and user selected answers associated with the given IED in the predetermined uniform terminology; and the at least one processor storing the one or more IED reports in the electronic memory, and outputting the IED reports to an external system.

2. The apparatus of claim 1, comprising a camera operatively coupled with the at least one processor, and wherein the at least one processor renders a prompt on the user interface to prompt the user to take a photo of an IED site, and stores the corresponding image data as part of the IED report associated with an IED corresponding to the photographed IED site.

3. The apparatus of claim 1, wherein the user interface allows a user to draw a sketch, and wherein the at least one processor renders a prompt on the user interface to prompt the user to draw a sketch, and stores the corresponding image data as part of the IED report associated with an IED corresponding to the sketch.

4. The apparatus of claim 1, wherein the user interface allows a user to enter text, and wherein the at least one processor renders a prompt on the user interface to prompt the user to enter text in association with a given IED, and stores the entered text as part of the IED report associated with the given IED.

5. The apparatus of claim 1, wherein the user interface allows a user to enter and record audio information, and wherein the at least one processor renders a prompt on the user interface to prompt the user to enter audio information in association with a given IED, and stores the entered audio information as part of the IED report associated with the given IED.

6. The apparatus of claim 1, wherein the prompting information includes at least one predefined question and a corresponding plurality of predefined answers with respect to IED type.

7. The apparatus of claim 1, wherein the prompting information includes at least one predefined question and a corresponding plurality of predefined answers with respect to at least one IED activation component.

8. The apparatus of claim 1, wherein the prompting information includes at least one predefined question and a corresponding plurality of predefined answers with respect to at least one IED explosive component.

9. The apparatus of claim 1, wherein the prompting information includes at least one predefined question and a corresponding plurality of predefined answers with respect to at least one IED projectile component.

10. A computer-implemented method for acquiring and assembling improvised explosive device (IED) data, comprising executing on a processor in accordance with instructions of an IED network analysis component stored in an electronic memory the steps of:

prompting a user on a user interface operated by the processor with predefined questions and corresponding predefined answers with respect to at least one of IED components and IED structure;

receiving user selected answers input by the user via the user interface to at least some of the predefined questions;

receiving geolocation information associated with a current position of the apparatus;

converting the geolocation information associated with the given IED and user selected answers associated with the given IED into a predetermined uniform terminology;

generating one or more IED reports individually associated with a given IED, wherein individual IED reports include the geolocation information associated with the given IED and user selected answers associated with the given IED in the predetermined uniform terminology; and storing the one or more IED reports in an electronic memory.

11. The method of claim 10, further comprising:
providing one or more IED reports to a structured database.

12. The method of claim 10, wherein prompting a user on a user interface operated by the processor with predefined questions and corresponding predefined answers comprises prompting the user with at least one predefined question and a corresponding plurality of predefined answers with respect to IED type.

13. The method of claim 10, wherein prompting a user on a user interface operated by the processor with predefined questions and corresponding predefined answers comprises prompting the user with at least one predefined question and a corresponding plurality of predefined answers with respect to at least one IED activation component.

14. The method of claim 10, wherein prompting a user on a user interface operated by the processor with predefined questions and corresponding predefined answers comprises prompting the user with at least one predefined question and a corresponding plurality of predefined answers with respect to at least one IED explosive component.

15. The method of claim 10, wherein prompting a user on a user interface operated by the processor with predefined questions and corresponding predefined answers comprises prompting the user with at least one predefined question and a corresponding plurality of predefined answers with respect to at least one IED projectile component.

16. A computer-implemented method of analyzing improvised explosive device (IED) data, comprising executing on a processor the steps of:
(a) receiving a selection of a geolocation range for analysis in a computer with the processor;
(b) accessing a structured database having multiple IED records associated with the selected geolocation range, each IED record corresponding to a single IED in the selected geolocation range;
(c) receiving a selection of one or more attributes associated with at least one of IED components and IED structure for analysis;
(d) receiving a selection of a similarity correlation percentage value;
(e) comparing IED records for each IED against IED records for each other IED in the selected geolocation range based on the selected one or more attributes;

(f) for each pair of IEDs compared, determining a percentage of matching selected one or more attributes;

(g) for each pair of IEDs compared whose percentage of matching selected one or more attributes is greater than or equal to the selected similarity correlation percentage value, identifying the pair of IEDs compared as related;

(h) generating a visual rendering of each compared IED at a corresponding geolocation within the selected geolocation range, including lines connecting all pairs of IEDs compared identified as related;

(i) receiving a selection of at least one of an adjusted similarity correlation percentage value and one or more adjusted attributes; and (j) repeating steps (e)-(h) using at least one adjusted similarity correlation percentage value or at least one of the one or more adjusted attributes.

17. The method of claim 16, further comprising:
(k) receiving a selection of one or more different colors for visually rendered IEDs for subsets of selected attributes.

18. The method of claim 17, further comprising:
(l) overlaying the visual rendering of compared IEDs over a map or satellite image corresponding to the rendered geolocation range in the visual rendering.

19. The method of claim 16, further comprising:
(l) overlaying the visual rendering of compared IEDs over a map or satellite image corresponding to the geolocation range.

20. The method of claim 16, wherein receiving a selection of one or more attributes associated with at least one of IED components and IED structure for analysis comprises receiving a selection of at least one of IED type, IED activation component, IED explosive component, and IED projectile component.

* * * * *